(12) United States Patent
Jain et al.

(10) Patent No.: US 12,481,666 B1
(45) Date of Patent: Nov. 25, 2025

(54) ENHANCED DOCUMENT RETRIEVAL WITH SEMANTIC DEPTH AND SYNTACTIC STRUCTURE

(71) Applicant: Intuit Inc., Mountain View, CA (US)

(72) Inventors: Siddharth Jain, Mountain View, CA (US); Sivashanker Thiruchittampalam, Toronto (CA); Jonathan Lin, Gloucester (CA); Venkat Narayan Vedam, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/791,219

(22) Filed: Jul. 31, 2024

(51) Int. Cl.
    *G06F 16/2457* (2019.01)
    *G06F 16/901* (2019.01)
    *G06F 16/93* (2019.01)

(52) U.S. Cl.
    CPC .... *G06F 16/24578* (2019.01); *G06F 16/9024* (2019.01); *G06F 16/9027* (2019.01); *G06F 16/93* (2019.01)

(58) Field of Classification Search
    None
    See application file for complete search history.

(56) References Cited

U.S. PATENT DOCUMENTS

| | | | |
|---|---|---|---|
| 12,204,524 B1 * | 1/2025 | Birru | G06F 16/90335 |
| 12,411,896 B1 * | 9/2025 | Selman | G06F 16/90335 |
| 2024/0037128 A1 * | 2/2024 | Koneru | G06F 16/3329 |

* cited by examiner

Primary Examiner — Irene Baker
(74) Attorney, Agent, or Firm — Dinsmore & Shohl LLP

(57) ABSTRACT

Certain aspects of the present disclosure describe a method of information retrieval. In certain aspects, the method includes identifying a set of relevant nodes of a document graph embedding semantic units associated with the document based on a document search query. The method further includes reconstructing a structural context for each relevant node in the set of relevant nodes. The method further includes processing the set of relevant nodes and the structural context of each relevant node with a large language model to generate a contextual response to the document search query.

20 Claims, 10 Drawing Sheets

Document 400 type Query {
    getUser(id: ID!): User
    # Query to get the book details
    getBook(input: BookInput!): Book
    getAuthor(id:ID!): Author
    getBooksByUser(user: ID!): [Book]
}
— 420, 410, 430

Book type contains the details of the book — 432
type Book {
    id: ID!
    title: String!
    author: Author!
    user: User
}
— 422, 412 type Author {
    id: ID!
    name: String!
    books: [Book]
}
— 414

User and the books read — 426
type User {
    id: ID!
    name: String!
    books: [Book]
}
— 416

Input BookInput {
    title: String!
    author: AuthorID!
}
— 438, 418

FIG. 4

Example GraphQL Query Generation 600

```
Query {
    company {
        department {
            team {
                employee {
                    id
                    name
                    position
                }
            }
        }
    }
}
```

608 — company {
606 — department {
604 — team {
602 — employee {
610 — id
612 — name
614 — position

FIG. 6B

ENHANCED DOCUMENT RETRIEVAL WITH SEMANTIC DEPTH AND SYNTACTIC STRUCTURE

BACKGROUND

Field

Aspects of the present disclosure relate to enhanced information retrieval, in particular, to enhanced information retrieval based on semantic depth and syntactic structure.

Description of Related Art

Information retrieval is the process of identifying and retrieving information, including documents or other data stored in large data repositories. An information retrieval system allows users to communicate with the system in order to find information—text, graphic images, sound recordings, video, etc. that meet their specific needs. For example, the objective of a text information retrieval system may be to enable users to find information from an organized collection of documents that is relevant to answer a query, where the query is a question or a request for such information.

Document retrieval is a specific branch of information retrieval in which the search is for the documents themselves. Search engines, such as Google® and Bing®, are commonly used document retrieval systems to search for websites (which may be examples of documents). A user enters a search query, often comprising keywords or search terms, into the search engine. The search engine searches a data repository, for example, the Internet, to analyze and rank websites based on relevancy to the search query.

One way to determine relevance of a document to a search term is through a lexical search. In a lexical search, keywords and terms in a search query are matched to keywords and terms from the data repository. In an internet search engine, the search query terms are matched to keywords and terms on websites. In a document retrieval example, the search query terms are matched to keywords and terms within a document.

One technical problem with a lexical search is that the lexical search identifies matching of exact terms, but without the context of the terms. Specifically, natural language may be troublesome for a term-based search due to homographs, that is, a word with two or more meanings. For example, a search for a "bow" may n return results related to a stringed weapon, a hair accessory, and the front of a ship. Other linguistic quirks may similarly result in nonsensical or irrelevant search results. For example, euphuisms, figures of speech, slang, or idioms in a search query may achieve poor search results. Other times, a search query might not contain an exact keyword or term, for example, by using implication to search, misspelling of a term, or misuse of a term. For example, rather than searching using the term "onomatopoeia", a search query may search for "animal sounds" without using a key term, use a misspelled term "On a Mona Pia", or use an incorrect term "homophone".

One method for improving search is to utilize the user's intent and context of search terms through semantic understanding of a search query. For example, a semantic search for a "bow for Olympic archery" would obtain results related to recurve bows, while a search for "bow for long hair" would obtain results related to hair bows. Semantic search, however, requires natural language processing (NLP) of a search query through complex algorithms or machine learning models. Accurate models require extensive training and maintenance, while also being slower compared to simpler lexical searching.

Accordingly, there is a need for improved information retrieval systems.

SUMMARY

Certain aspects provide a method of integrated search in structurally complex documents, comprising: receiving a document search query; identifying a set of relevant nodes of a document graph comprising a plurality of embedded semantic units of a document, comprising: performing a semantic search of the document graph based on the document search query to identify a first relevant node; and performing a lexical search of the document graph based on the document search query to identify a second relevant node; reconstructing a structural context for each relevant node in the set of relevant nodes, comprising: backtracking the document graph based on the each relevant node to identify a hierarchical structure of the relevant node; forward tracking the document graph based on the each relevant node to identify one or more details associated with the each relevant node; and constructing a path of the document graph based on the hierarchical structure of the each relevant node and the one or more details associated with the each relevant node; and processing the set of relevant nodes and the structural context of the each relevant node with a large language model to generate a contextual response to the document search query.

Certain aspects provide a method of integrated search in structurally complex documents, comprising: receiving a document search query to augment a prompt to a large language model (LLM); identifying a set of relevant nodes of a document graph comprising a plurality of embedded semantic units of a document, comprising: performing a semantic search of the document graph based on the document search query to identify a first relevant node; and performing a lexical search of the document graph based on the document search query to identify a second relevant node; reconstructing a structural context for each relevant node in the set of relevant nodes, comprising: backtracking the document graph based on the each relevant node to identify a hierarchical structure of the relevant node; forward tracking the document graph based on the each relevant node to identify one or more details associated with the each relevant node; and constructing a path of the document graph based on the hierarchical structure of the each relevant node and the one or more details associated with the each relevant node; and providing the set of relevant nodes and the structural context of the each relevant node with the prompt to the LLM to generate a contextual response.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIG. 4 depicts an example structured document that may be searched by an information retrieval system.

FIG. 6B depicts an example API query which may be generated by an information retrieval system.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
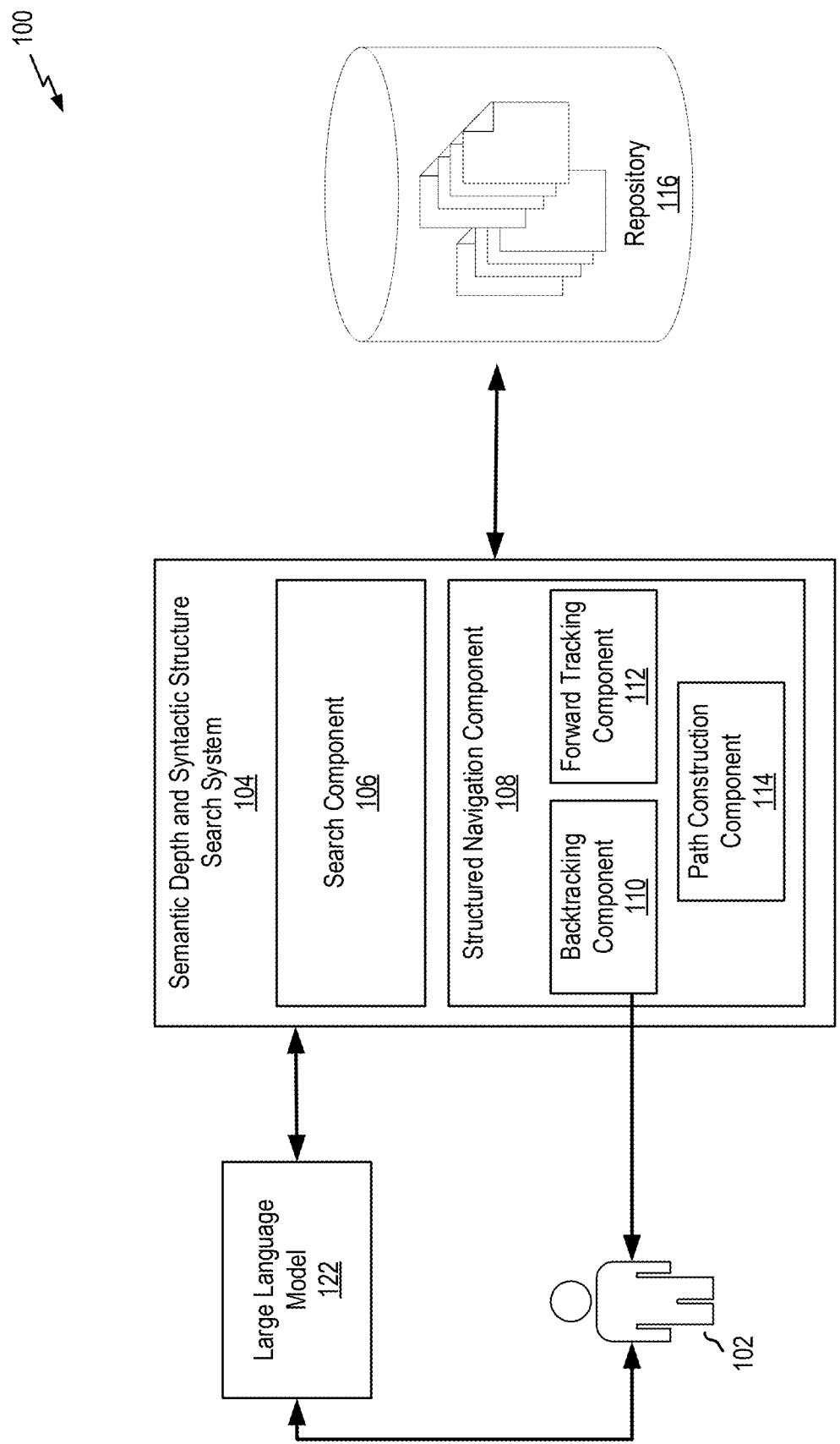
FIG. 1 depicts an example information retrieval system.

Aspects of the present disclosure provide apparatuses, methods, processing systems, and computer-readable mediums for information retrieval, including enhanced document retrieval based on semantic depth and syntactic structure.

Information retrieval through search engines is ubiquitous to modern life. Information retrieval systems facilitate, for example, online shopping by directing a user to a particular product page, education and learning by directing a user to a particular article, or assistance by directing a user to a user manual, among many others. As used herein, a document may refer to a structured or unstructured piece of text or graphics, for example, a text document, a webpage, a record, a table, and the like. In some examples, a document may include a source code file, a programming documentation, a markup language (e.g., HTML, XML, etc.) document, a configuration file, a style sheet, a build file (e.g., Makefiles, Maven pom.xml, etc.) an API specification, a query language specification (e.g., SQL, GraphQL, OpenAPI, etc.), or a protocol specification.

Conventional document retrieval search methodologies often rely on a semantic relevance and/or a lexical relevance to identify relevant documents. As described herein, lexical relevance utilizes keyword matching between a search query and keywords within a document to determine relevance, that is, the more keywords common to both the search query and a particular document, the more relevant the document. The document is parsed into individual keywords for matching.

Semantic relevance, however, utilizes natural language processing (NLP) to understand the context of the search query and the document text. The document is chunked into semantic units, including words, subwords, phrases, sentences, and paragraphs, to capture relationships between the units and concepts contained therein.

Current document retrieval methodologies may be inadequate for a document repository comprising structurally complex documents, such as source code, programming documentation, markup languages, configuration files, style sheets, build files, protocol specifications, query languages and others, because such methodologies disregard the structural context of a document. The structural context of the document describes the arrangement of and relations between the content of the document and may include a hierarchy and organization of the document. For example, in some documents, the structure of the document may convey as much, or even more context to the content as the surrounding text. Moreover, such structural context may be fundamental to the clarity and usability of content, for example, the location and arrangement of content conveys additional meaning beyond the text of the content itself.

For example, a research article may contain a set of nested sections, such as an abstract section, an introduction section, a research methods section, a results section and a conclusions section. The location of a particular term in the research article conveys additional meaning, for example, a term appearing in a subsection of the research methods section indicates the term is related to methodologies used to generate the results described in the results section, whereas the term appearing in a next steps subsection of the conclusions section may indicate the term is related to not-tested methodologies and not supported by the results. Thus, the organization and structure of a document, e.g., the structural context of the document, conveys additional meaning beyond the content itself.

However, conventional approaches often disregard such structure when determining relevant documents because conventional approaches rely on either keyword matching in which only the term itself matching determines relevance (e.g., lexical search), and/or semantic relevance in which a context of a term is used to determine relevance (e.g., semantic search). Further, such conventional approaches may isolate semantic units and keywords, e.g., through chunking to facilitate searching. With chunking, the text is broken down into semantic units or keywords; for example, a document containing the sentence "GraphQL is a query language for an API" may be chunked into "GraphQL" "query language" "API". For a keyword search, each chunk (e.g., keyword) is embedded into an index, which may be searched by finding a match, e.g., searching for "GraphQL" will match with the chunk "GraphQL" of the document. In a semantic search, the query is embedded into the index, and which may be searched based on a closeness between the embedded chunk and the embedded query.

However, by chunking, the relationship between the words of the sentence are not captured in the index, for example, the relationship between GraphQL and the query language may not be captured. Further, when chunking a large document, the relationships between sentences, paragraphs, sections, headings, and the like, are similarly not captured. For example, the preceding sentence may be in a language section of a GraphQL specification, but chunking isolates each chunk from one another, and the structure, e.g., GraphQL query and the language section. Thus, chunking removes the structural context of documents when embedding documents into the index. Accordingly, conventional search approaches are technically limited and unable to utilize the structural context in generating search results.

Aspects of the present disclosure provide technical solutions to the aforementioned technical problems with conventional lexical and semantic search systems, and enable extraction of structural context of search results in document-based search retrieval. Certain aspects provide for an integrated search based on both lexical and semantic search, and rebuilding the context of the integrated search results to provide the structural context of the search results. In some aspects, the information retrieval system and methods described herein may beneficially enable searching through highly-structured documentation, such as legal text, structured data files, or complex application programing interface (API) documentation to identify information with the document relevant to the search request, as well as identify the structural context of the relevant information to supplement and expand on the context and details. Thereby, a comprehensive and coherent search result may be generated.

One technical benefit achieved by the information retrieval system described herein is searching using both semantic and lexical relevance. Certain aspects described herein provide for an integrated relevance score based on both semantic search results and lexical search results to complement one another and provide lexically precise and conceptually relevant search results for the query. Moreover, in certain aspects, the integrated relevance score may be dynamically adjusted to impart increased reliance on either the semantic search results or the lexical search results to bias search results with increased semantic relevance, or lexical relevance. Thereby, the relevance of search results may be adjusted based on the context of the query.

Another technical benefit achieved by the information retrieval system described herein is reconstructing the structural and syntactic context of a search result to provide coherence and context of the search result. Because a search result taken out of context may be incoherent, or otherwise unclear, providing the context improves clarity. For example, a search for GraphQL query may return the chunk, "GraphQL is a query language for an API" as a search result. The context of the search result, that it is in a GraphQL language section of a GraphQL specification, conveys additional meaning, that the GraphQL language is established for GraphQL-based APIs. This additional information provide context for the identified search result as well as provides additional clarity.

Certain aspects described herein overcome the limitation of conventional search techniques, which isolate chunked sections of a document and lose the structure of the document. Aspects provide for reconstructing the context of a search result to identify and associate such structural and syntactic context because the structural and syntactic context, e.g., sections, subsections, tables, etc., of the document may provide additional context beyond the accompanying text. In certain aspects, each document in the document repository may be modelled as a document graph, embedding the content as nodes and relationships between content as edges. Thereby, the relationships between the content, including structural context, are retained. The context of the search result may be reconstructed by backwards tracing the search result to identify one or more parent nodes associated with the search result, embodying the higher-level context. Thus, search results may have broader context, imparting increased information and understanding.

Yet another technical benefit achieved by the information retrieval system described herein is constructing and identifying additional details associated with a search result to provide a more complete context and thorough details associated with the search result. For example, returning to the GraphQL example, the language section of the GraphQL specification may further include subsections related to operations, types and fields, arguments, and the like used in the GraphQL language, which provide in-depth details, such as for use in writing a GraphQL query. Certain aspects described herein enable identification of related additional information and sections of documents to provide expanded details and descriptions of search results. Additional details may be identified based on forward tracing the search result to identify one or more child nodes associated with the search result, each child node containing additional information. Thus, additional information associated may be identified and supplement the search result.

Another technical benefit achieved by the information retrieval system described herein is the ability to generate ordered responses using syntactic reconstruction. For example, in certain aspects, the information retrieval system may be configured to search for documents related to an API specification, such as a GraphQL specification, to obtain information regarding API queries. A search result may be a definition of a GraphQL query operation. Higher-level structural information may add context of the structure of a GraphQL query, and lower-level structural information may add details regarding the permissible types and fields associated with a query operation. Thereby, the information retrieval system described herein, in certain aspects, may utilize the search result, higher-level information, and lower-level information to generate a structured response of a GraphQL query. Beneficially, the information retrieval system obtains this additional information, e.g., higher-level and lower-level information associated with the search result, and obtains the structural relationship between the information. Thereby, the structural context of a search result is obtains with greater clarity and understanding. Accordingly, aspects of the present disclosure provide enable extraction of structural context of search results in document-based search retrieval by utilizing both lexical and semantic search in an integrated search and reconstruct the structural context of the search results to provide a structural context. By providing such structural context, additional context and information may be obtained to improve the clarity and understanding of the search result. In some aspects, the information retrieval system and methods described herein may beneficially enable searching through highly structured documentation, such as legal text, structured data files, or complex API documentation to identify information with the document relevant to the search request, as well as identify the structural context of the relevant information to supplement and expand on the context and details. Thereby, a comprehensive and coherent search result may be generated.

Additionally, embodiments described herein utilize the information retrieval systems and methods described herein to supplement large language model (LLM) response generation, for example, as part of a retrieval-augmented generation (RAG) system.

LLMs are machine learning models which support natural language processing tasks, including retrieving information and providing it in a conversational manner. Generally, general-purpose LLMs are training on large amounts of data and utilize such training to generate a response. However, such general-purpose LLMs may be unable to respond or respond incorrectly when requested information is not part of the training data. A RAG system is a method to improve the performance of an LLM by providing additional information to augment the training data, and assist the LLM in generating a response. In particular, the additional information is determined by a retrieval component and provided to a generation component to use the retrieved information in generating the response.

Aspects of the present disclosure exploit such methods through improved document retrieval, including retrieval of structurally complex documents. By combining the input query with the contextual documents, the LLM receives a comprehensive input that incorporates both the user's query and the relevant information from external sources. This method helps to reduce the risk of generating irrelevant responses, as well as improves the overall accuracy and/or relevance of the response. Thus, the LLM's performance may be improved because the LLM has additional data to utilize in generating the response. In certain aspects, by utilizing the improved document retrieval methods described herein, to identify and obtain relevant additional data through the retrieval-based component of the LLM, the performance and output of the LLM may be improved.

Example Information Retrieval System

FIG. 1 depicts an example information retrieval system 100 for retrieving information from an information repository 116. In some embodiments, the information may be stored in one or more documents stored in the information repository 116. As used herein, a document may refer to a structured or unstructured piece of text or graphics, for example, a text document, a webpage, a record, a table, and the like. In some examples, a document may include a source code file, a programming documentation, a markup language (e.g., HTML, XML, etc.) document, a configuration file, a style sheet, a build file (e.g., Makefiles, Maven pom.xml, etc.) an API specification, a query language specification (e.g., SQL, GraphQL, OpenAPI, etc.), or a protocol specification.

A user 102 searches for relevant information with a semantic depth and syntactic structure search system 104. In some embodiments, the user 102 searches with the semantic depth and syntactic structure search system 104 through a large language model (LLM) 122.

An LLM is a type of machine learning model that supports natural language processing tasks. An LLM may be configured to generate text, analyze sentiment, answer prompts (e.g., specific instructions and/or requests) in a conversational manner, translate text from one language to another, summarize content, and/or the like. LLMs make it possible for software to "understand" typical human speech or written content, and respond to it. In some cases, an LLM may be used to retrieve information and provide it in a conversational manner. Examples of LLMs include a generative pre-trained transformer (GPT), or a bidirectional encoder representations from transformers (BERT). Both a GPT model and a BERT model are based on a transformer architecture (e.g., architecture that uses an encoder-decoder structure and does not rely on recurrence and/or convolutions to generate an output), pre-trained in a generative and unsupervised manner (e.g., it learns from data without being given explicit instructions on what to learn). An LLM analyzes prompts and predicts the best possible responses based on their understanding of the language. In some embodiments, the user 102 may utilize the LLM 122 to search for relevant documents and generate a summary of the information, retrieve a document, or retrieve information.

The semantic depth and syntactic structure search system 104 comprises a search component 106 and a structured navigation component 108. The search component 106 is configured to search the information repository 116 to identify relevant documents. In some embodiments, each document in the information repository 116 is modelled as one or more document graphs. Within a graph, semantic units, such as paragraphs, sections, keywords, terms, etc., are embedded as nodes. Edges connect the nodes of the graph and denote the relationships between the semantic units within the document. Edges may indicate the structural and syntactic linkages between various nodes. Further, an edge may indicate a parent-child relationship between two nodes. Modelling documents as document graphs is discussed further with respect to FIG. 3.

In some embodiments, the search component 106 is configured to identify relevant documents based on an integrated search, comprising both semantic relevance and lexical relevance. For example, the search component 106 is configured to determine semantic relevance of one or more documents based on the meaning and context of the query of the user 102. In some embodiments, the search component 106 is configured to utilize NLP and natural language understanding (NLU) techniques to understand the intent of the query and determine semantically relevant documents.

As another example, the search component 106 is configured to determine lexical relevance of one or more documents based on keyword matching between the query of the user 102 and one or more of the documents stored in information repository 116. In some embodiments, the search component 106 is configured to utilize syntax of the query to identify a keyword match.

In some embodiments, the search component 106 is configured to identify relevant documents based on an integrated relevance score, comprising both semantic relevance and lexical relevance. Beneficially, by searching based on both semantic and lexical relevance, the search component 106 may generate an integrated relevance score. The integrated relevance score balances and complements semantic searching and lexical searching to provide lexically precise and conceptually relevant search results. Further, and as described in further detail with respect to FIG. 2, the integrated relevance score is dynamically adaptable to impart increased reliance on semantic results or lexical results based on the context of the query. For example, the integrated relevance score may be adjusted based on additional data, such as previous queries, user attributes, domain-specific systems, and the like associated with the user and/or the system to promote increased contextual relevance or lexical accuracy of the integrated relevance score. Thus, the information retrieval systems described herein provide improved search results with greater relevance to a query.

The structured navigation component 108 is configured to construct a structural context of the search results determined by the search component 106 to address the user's 102 query. The structured navigation component 108 comprises a backtracking component 110 configured to trace a backward path from a search result to identify higher-level hierarchical structure of the search result. The structured navigation component 108 also comprises a forward tracking component 112 configured to trace a forward path from the search result to identify lower-level hierarchical structure of the search result. The structured navigation component 108 ensures a comprehensive contextual integration by capturing the hierarchical framework surrounding a relevant node, e.g., navigating both up and down a document's structure, to capture the structural context and details of the document. Beneficially, the structured navigation component 108 enables contextual response to a search query. For example, the structured navigation component 108 overcomes limitations of conventional searching techniques that isolate chunks of text by enabling reconstruction of the structural context of the search results by navigating a graph to identify the hierarchical relationships captured by edges connecting nodes.

The structured navigation component 108 further comprises a path construction component 114 configured to construct the structural context of the search results based on the backward path and the forward path determined by the backtracking component 110 and the forward tracking component 112, respectively. The path construction component 114 beneficially captures the hierarchical organization identified by the structured navigation component 108 to generate the structural context of a document. Because the structural context of the document may be fundamental to clarity and usability of the content, for example, by conveying additional information regarding the content due to the organization and structure of the document, the path construction component 114 enables recreation of the hierarchy and organization of the document placing a search result within the broader context of the overall document.

The structured navigation component 108 then utilizes the search results as well as the structural context to response to the user's 102 query. In some embodiments, where the user 102 utilizes the LLM 122 to search, the LLM 122 is configured to utilize the search results and the structural context to generate a response to the user's 102 query. For example, as part of a RAG-based system to augment a query used by the LLM 122 to generate a response to the query.

Accordingly, information retrieval system 100 enables building of structural context of search results in document-based search retrieval by utilizing both lexical and semantic search in an integrated search and reconstructing the structural context of the search results to provide a structural context. The structural context and additional information may be obtained to improve the clarity and understanding of the search result. In some aspects, the information retrieval system and methods described herein may beneficially enable searching through highly-structured documentation, such as legal text, structured data files, or complex API documentation to identify information with the document relevant to the search request, as well as identify the structural context of the relevant information to supplement and expand on the context and details. Thereby, a comprehensive and coherent search result may be generated.

Figure 2:
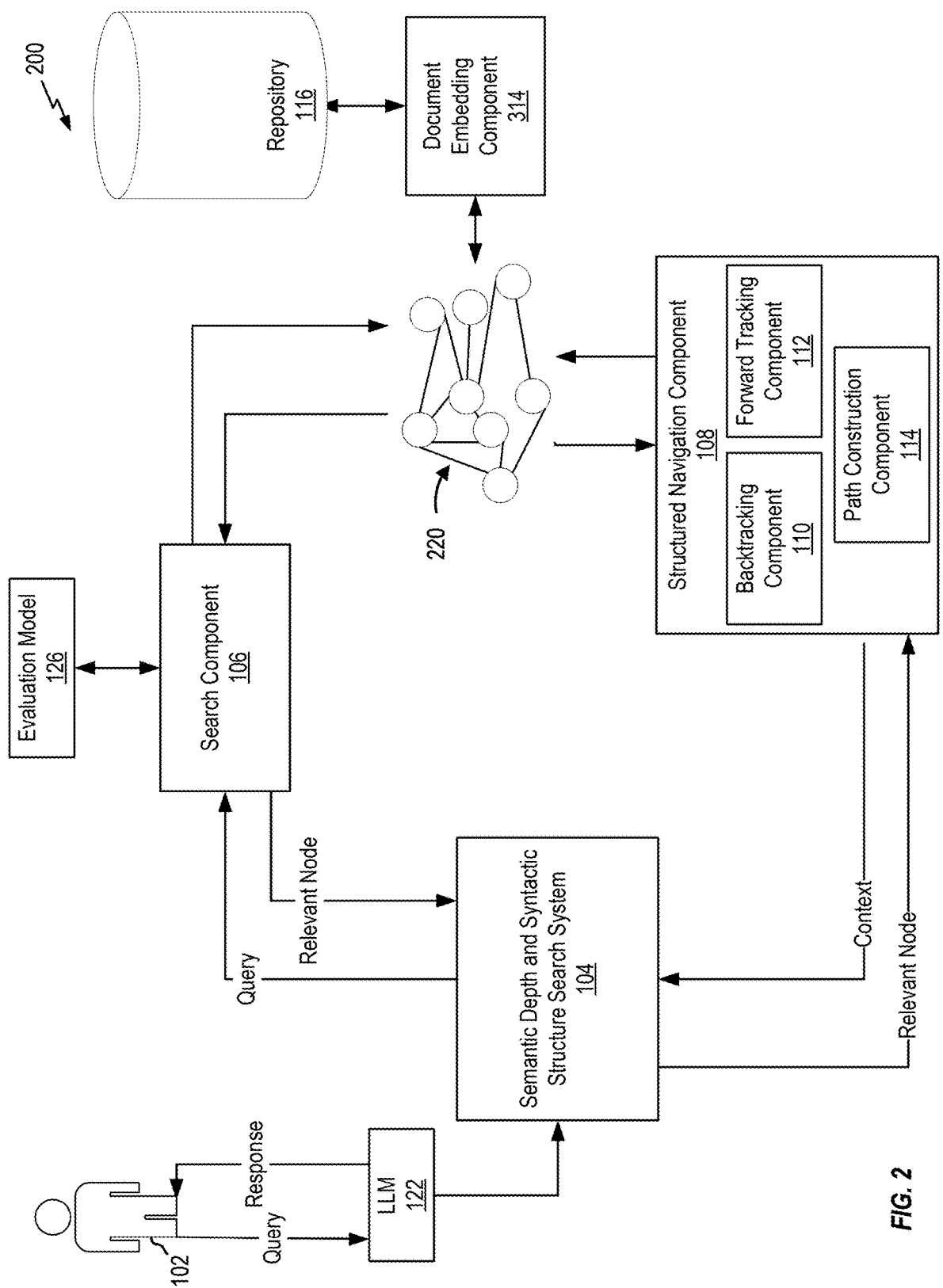
FIG. 2 depicts an example workflow for retrieving information with an information retrieval system.

Example Workflow for Retrieving Information with an Information Retrieval System FIG. 2 depicts an example workflow 200 for retrieving information with an information retrieval system, for example, the information retrieval system 100 in FIG. 1. Components of the system 100 are depicted in this example separately for clarity, although all may be part of system 100 in FIG. 1.

In the example depicted in FIG. 2, the user 102 searches for relevant documents with the semantic depth and syntactic structure search system 104 through the LLM 122. In some embodiments, the LLM 122 may utilize search results in a retrieval-augmented generation (RAG) process. RAG is a method to improve the performance of an LLM by providing additional data to the LLM to supplement the available information used by the LLM in generating the response. The LLM will be able to utilize external data, that is, data that is not part of the training data used to train the LLM, in generating the response. External data may be in a database, document repository, or otherwise available through an API or microservice. Beneficially the external data may provide domain-specific information, for example, information related to a specific application, an internal system, or a domain-knowledge database, for use by the LLM in generating a response.

For example, a RAG system may be designed with a retrieval-based component and a generative component. The retrieval-based component may retrieve relevant documents, passages, and/or text from a data repository and/or corpus based on receiving an input query. The retrieved documents, passages, and/or text may be concatenated as context with the original input query and provided to the generative component (e.g., a text generator) of the RAG system, which in turn produces text output for the input query. By combining the input query with the contextual documents, the LLM receives a comprehensive input that incorporates both the user's query and the relevant information from external sources, for example, a reference document related to the user's query, and the user's query. This method helps to reduce the risk of generating irrelevant responses, as well as improves the overall accuracy and/or relevance of the response. Thus, the LLM's performance may be improved because the LLM has additional data to utilize in generating the response.

In the example depicted in FIG. 2, the LLM 122 may utilize the semantic depth and syntactic structure search system 104 as a retrieval component. For example, the LLM 122 may process a query from the user 102 and search for relevant additional information among information repository 116 using the semantic depth and syntactic structure search system 104. The search results, e.g., one or more documents stored in the information repository 116, and the structural context associated with each search result may be provided to the LLM 122 to generate a response to the user 102.

In some embodiments, the user 102 may search directly with the semantic depth and syntactic structure search system 104, e.g., sending a query to and receiving a response from the semantic depth and syntactic structure search system 104.

Whether the search query is sent directly by the user 102, or via the LLM 122, the semantic depth and syntactic structure search system 104 is configured to obtain search results and contextual framework for the search results based on the search query. The semantic depth and syntactic structure search system 104 is configured to send the search query to the search component 106 to obtain one or more search results. The search component 106 is configured to search through a set of document graphs 220 representing the information repository 116. Each document in the information repository 116 is embedded as a document graph of the set of document graphs 220 with a document embedding component.

Figure 3:
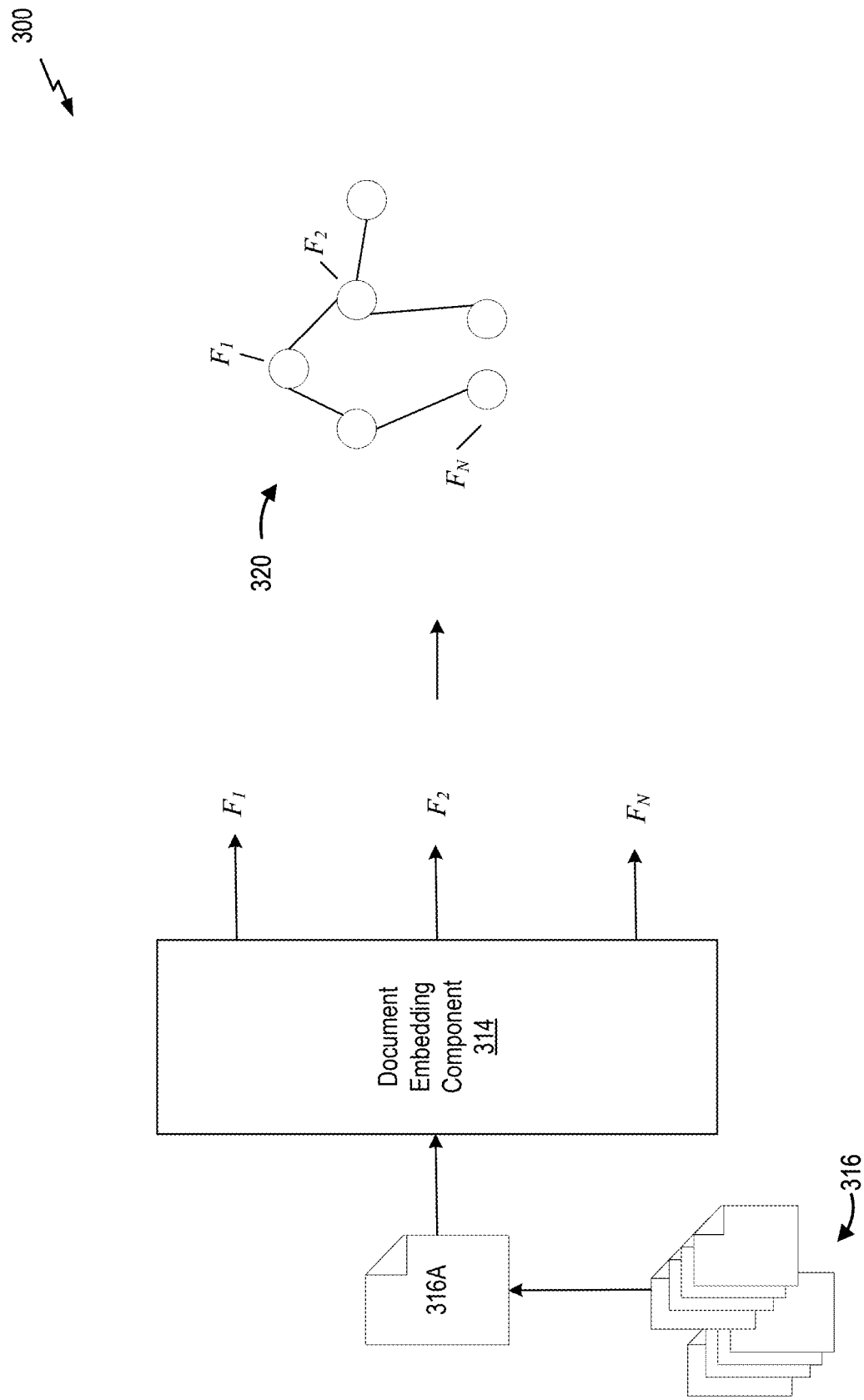
FIG. 3 depicts an example process for embedding documents as document graphs for searching by an information retrieval system.

FIG. 3 depicts an example process 300 for embedding documents as document graphs (e.g., one or more of the set of document graphs 220 in FIG. 2). FIG. 3 depicts process 300 with an example first document 316A of a set of documents 316, which may be stored in the information repository 116, however, the process may be repeated for each document in the set of documents 316, or any other documents to be searched.

First document 316A is processed by the document embedding component 314 to model the document as a document graph 320. For example, the document embedding component 314 is configured to convert text data to a numerical representation, which may be projected into a high-dimensional latent space (also called an embedding space). The document embedding component 314 is configured to chunk the first document 316A into semantic units, for example, words, sub-words, phrases, sections, paragraphs, and the like, and embed each semantic unit into the embedding space as a node. The first document 316A is chunked into semantic units (e.g., fragment, F) and embedded as nodes, e.g., $F_i$, where i=1, ..., N, and N indicates the number of fragments of the first document 316A, into the document graph 320. The relationships between each fragment, e.g., nodes $F_1$ and $F_2$, are denoted by edges connecting the nodes. Each document of the set of documents 316 is modelled in a document graph. Thus, the structural framework of each document in the set of documents 316 is modelled in the document graph, whereby the structure of the document is searchable.

In some embodiments, the document embedding component 314 is configured to utilize a transformer-based technique to embed a document, such as a BERT word embedding technique, a long short-term memory (LSTM) embedding technique, or a GPT embedding technique.

Returning to FIG. 2, Document graphs facilitate searching, including searching based on semantic and/or lexical relevance. The search component 106 is configured to obtain the one or more search results based on semantic and/or lexical relevance. The search component 106 is configured to obtain one or more search results based on an integrated search, comprising both semantic and lexical relevance. Further, the search component 106 is configured to generate an integrated relevance score, e.g., based on both semantic relevance and lexical relevance, of each node of each document graph of the set of document graphs 220. For example, the search component 106 is configured to generate an integrated relevance score based on a semantic score and a lexical score for each node (e.g., $F_1, F_2 \ldots F_N$ of FIG. 3) of a document graph (e.g., document graph 320 of FIG. 3) of each document in the information repository.

The search component 106 is configured to generate an integrated relevance score based on a semantic relevance score and a lexical relevance score for each node. In particular, the integrated relevance score beneficially combines the semantic relevance score and the lexical relevance score while also accounting for divergences between the semantic search results and the lexical search results. The semantic search results account for the semantic context and structure of the text, e.g., the information repository 116. The lexical search results account for the importance of terms within a corpus, e.g., within the information repository 116.

In one example, the integrated relevance score is determined as follows:

Integrated Score$(F_i,Q)$=($\alpha$·semantic relevance score $(F_i,Q)$)+$(1-\alpha)$·lexical relevance score$(F_i,Q)$ In the preceding formula, the a term is a weighted hyperparameter, which sets the balance between the contribution of the semantic relevance score and the lexical relevance score. If $\alpha$ is close to 1, the lexical relevance score contributes more to the integrated relevance score. Thus, where $\alpha$=1, only the lexical relevance score contributes to the integrated relevance score. Whereas, if $\alpha$ is close to 0, semantic relevance score contributes more to the integrated relevance score. Thus, where $\alpha$=0, only the semantic relevance score contributes to the integrated relevance score.

The $\alpha$ term may be adjusted to adjust the bias between the semantic relevance score and lexical relevance score to the integrated relevance score. Thereby, the search results may balance contextual relevance and lexical accuracy of search results to the query.

The evaluation model 126 is configured to predict the a term based on the query. In embodiments, the evaluation model 126 optimizes the hyperparameter, e.g., the $\alpha$ term, or also called tuning, to determine the optimal hyperparameter for the search component 106. The evaluation model 126 can be any type of machine learning model, such as, but not limited to, a neural network, decision tree, support vector machine, ensemble model, etc. In some embodiments, the evaluation model 126 is initially trained using a training dataset of user queries, and subject matter expert (SME) approved responses, for example, using reinforcement learning to determine the hyperparameter setting that best aligns the search results with the training data and the SME approved responses. Thus, the task of optimizing the hyperparameter is to identify a set of hyperparameter value(s) that minimizes the generalization error on the validation set. During training, the hyperparameters are set at initial values, the reinforcement learning algorithms learn by taking actions to maximize a reward (e.g., minimize the generalization error). Reinforcement learning is iterative in that the evaluation model learns as it explores possible states while exploiting, e.g., utilizing, those states which result in maximizing a reward. In particular, rather than trying every set of hyperparameters and evaluating each, in reinforcement learning, the evaluation model 126 navigates the hyperparameter space to determine the best configuration of hyperparameters by balancing exploiting already-explored hyperparameter values with high-confidence, with exploring new hyperparameter values with a potentially lower validation loss. By using a set of historical hyperparameter configurations and their associated rewards (e.g., based on the training data and the SME approved responses), the evaluation model 126 is trained to select the next hyperparameter setting to be evaluated in a way that maximizes the total reward within a limited budget.

In some embodiments, the evaluation model 126 may utilize Bayesian optimization to optimize the a term. Bayesian optimization uses a probabilistic model of the objective function, e.g., the model's performance for a set of hyperparameter values, and then evaluates various sets of hyperparameter values to determine the true objective function. The objective function indicates how well a set of hyperparameter values perform on the set of hyperparameters. The goal is to maximize the objective function e.g., finding the true objective function by approximating the objective function and updating the approximate objective function as sets of hyperparameters are evaluated. For example, the evaluation model 126 evaluates the model's performance based on the training data and the SME approved responses to determine the optimal set of hyperparameters.

Subsequently, in some embodiments, the a term may be dynamically tuned based on real-time user feedback, for example, based on direct user feedback or indirect user feedback. Direct user feedback includes user interactions directly stating the utility of the results, for example, thumbs up or thumbs down on the results, a user comment, and the like. Indirect user feedback includes user interactions indirectly indicating the utility of the results, for example, clicking through the search results, leaving the system, sending a second query, dwell time on the search results, and the like. Both direct and indirect feedback may be utilized to dynamically tune the a term.

The semantic relevance score($F_i$, Q) is a metric indicating the semantic relevance of a given fragment $F_j$ and the query Q. The search component 106 is configured to utilize NLU to analyze the query Q to determine intent and match the query Q to one or more contextually relevance nodes (e.g., node $F_i$). The query Q may be embedded into each document graph of the set of document graphs 220 with an embedding model (e.g., the document embedding component 314 in FIG. 3). In some embodiments, the semantic relevance is determined based on a similarity or distance between the node $F_i$ and the query Q. For example, the semantic relevance may be determined based on a cosine similarity between the node $F_i$ and the query Q. The cosine similarity ranges between −1 and 1 and measures the degree of similarity between two vectors, node $F_i$ and the query Q. The closer the cosine similarity is to "1", the more semantically similar the node $F_i$ and the query Q.

As another example, the semantic relevance may be determined based on a Euclidean distance. The Euclidean distance is the length of a line segment between two points. The closer the two points, the shorter the Euclidean distance. When two points are close together (e.g., short Euclidean distance), the more similar or relevant the two points. Thus, the Euclidean distance indicates similarly or semantic relevance between node $F_i$ and the query Q. A lower, or shorter distance indicates an increased semantic similarity between node $F_i$ and the query Q.

FIG. 4 depicts an example document 400 depicting five document fragments: first fragment 410, second fragment 412, third fragment 414, fourth fragment 416, and fifth fragment 418. The first fragment 410 comprises an example query, in this example, a GraphQL query. The example query includes semantic elements, e.g., semantic query element 420, and syntactic elements, e.g., lexical query element 430. In this example, the semantic query element 420 is a comment associated with the query indicating the query is to "get the book details" associated with the user. A semantic relevance search may return the second fragment 412, including a first semantically relevant element 422 based on a semantic relevance between the first semantically relevant element 422 and the semantic query element 420. The first semantically relevant element 422 is a comment indicating a book type contains the details of the book. A semantic relevance is determined between the query "get book details" and the "book type" because the book type contains the details of the book.

The semantic relevance search may also return the fourth fragment 416, including a second semantically relevant element 426 based on a semantic relevance between the second semantically relevant element 426 and the semantic query element 420. The second semantically relevant element 426, in this example, is a comment indicating the fragment contains the user and the books read by the user. A semantic relevance is determined between the query "get book details" and the books read by the user, in order to obtain the book details associated with the user.

In some embodiments, the semantic relevance may be determined based on the semantic relevance score of the node (e.g., fragment $F_i$) satisfying a threshold. For example, a semantic relevance score may satisfy a threshold when it meets or exceeds a semantic relevance threshold. In some embodiments, the semantic relevance may be determined based on the top K nodes, for example, the fragments associated with the top 2, 5, 10, etc., semantic relevance scores.

The lexical relevance score($F_i$, Q) is a metric indicating the lexical relevance of a of a given fragment $F_i$ and the query Q. The search component 106 is configured to match keywords or syntax between the query Q and one or more keywords or syntax in one or more nodes (e.g., node $F_i$). For example, the query Q may comprise "Find books authored by Benjamin Franklin," and a fragment node $F_i$ may comprise "author: Benjamin Franklin", and a keyword match "Benjamin Franklin" between the query Q and the fragment $F_i$. Various keyword searching and ranking algorithms may be used to determine keyword matches and rank the relevance of the fragment node based on the keyword matches. Example ranking functions include BM25, an example bag-of-words retrieval function, and TF-IDF.

In the example document 400 depicted in FIG. 4, a lexical relevance search may return the second fragment 412, including a first lexically relevant element 432 based on a lexical relevance between the first lexically relevant element 432 and the lexical query element 430. In this example, the lexical query element 430 indicates to return a book object, and the second fragment 412 includes the book object (e.g., the first lexically relevant element 432) based on matching syntax, as well as the fields associated with the book object.

The lexical relevance search may also return the fifth fragment 418, including a second lexically relevant element 438 based on a lexical relevance between the second lexically relevant element 438 and the semantic query element 420. In this example, the lexical query element 430 indicates to return a book object and the second lexically relevant element 438 includes a BookInput and fields of title and authorId associated with the book object, based on matching syntax.

In some embodiments, the lexical relevance may be determined based on the lexical relevance score of the node (e.g., fragment $F_i$) satisfying a threshold. For example, a lexical relevance score may satisfy a threshold when it meets or exceeds a lexical relevance threshold. In some embodiments, the lexical relevance may be determined based on the top K nodes, for example, the fragments associated with the top 2, 5, 10, etc., lexical relevance scores.

Returning to FIG. 2, an integrated relevance score may be generated based on the semantic and lexical relevance of each node of each document graph of the set of document graphs 220. The integrated relevance score indicates an overall relevance between each node and the query, balancing both semantic relevance and lexical relevance. For example, based on the semantic relevance score($F_i$, Q) and the lexical relevance score($F_i$, Q) for each node (e.g., fragment $F_i$), as well as the dynamically adjustable a term. Moreover, because integrated relevance score is dynamically adjusted, e.g., based on the a term, to increase the weight of the semantic relevance score or the lexical relevance score in the overall integrated relevance score, the search results may beneficially be weighted towards increased semantic relevance or lexical relevance. For example, a query comprising unstructured text may be weighted towards increased semantic relevance, while a query comprising structured text may be weighted towards increased lexical relevance.

A relevant node may be identified based on the integrated relevance score. In some embodiments, a relevant node may be identified based on the integrated relevance score satisfying a threshold, for example, an integrated relevance score may satisfy a threshold when it meets or exceeds an integrated relevance threshold. In some embodiments, a relevant node may be determined based on the top K nodes, for example, the fragments associated with the top 2, 5, 10, etc., integrated relevance scores.

In some embodiments, the search component 106 is configured to execute multiple searches, for example, iteratively searching to identify two or more relevant nodes of the document graph. In some embodiments, the search component 106 is configured to utilize a relevant node as a query for subsequent searches. For example, an initial search indicates a first node is a relevant node (e.g., based on the integrated relevance score) and a subsequent search utilizes the first node as a query to identify one or more additional relevant nodes (e.g., based on an integrated relevance score between the first node and the additional relevant node).

Thus, in some embodiments, one or more subsequent searches may improve the search coverage, for example, by refining and/or expanding the search scope and coverage. Some documents may include complex hierarchical or nested structures and subsequent searches may identify a deeply nested node (e.g., child node) based on refining the search scope. Further, subsequent searches may expand coverage, for example, by identifying nodes with additional keywords (e.g., for a lexical search), definitions, and/or additional details, to be used in a subsequent search.

In some embodiments, the search component 106 is configured to identify a set of relevant nodes. In some embodiments, the search component 106 is configured to identify the set of relevant nodes based on the integrated relevance score of each relevant node satisfying a threshold, for example, a relevant node's integrated relevance score may satisfy a threshold when it meets or exceeds a threshold. In some embodiments, the set of relevant nodes may be determined based on the top K nodes, for example, the nodes associated with the top 1, 2, 5, 10, etc., integrated relevance scores.

The semantic depth and syntactic structure search system 104 is configured to reconstruct the structural context of each relevant node in the set of relevant nodes identified by the search component 106. For each relevant node, the semantic depth and syntactic structure search system 104 utilizes the structured navigation component 108 to generate the structural context.

The structured navigation component 108 is configured to traverse the document graph for each relevant node in the set of document graphs 220 to generate the structural context. The structured navigation component 108 comprises the backtracking component 110, the forward tracking component 112, and the path construction component 114. The backtracking component 110 is configured to traverse the document graph starting at the relevant node to identify one or more parent nodes. In some embodiments, the backtracking component 110 is configured to identify the immediate parent node of the relevant node based on an edge connecting the relevant node and the parent node. The backtracking component 110 may continue to traverse the document graph to identify the immediate parent node of the previously-identified parent node. This process may repeat until a root node is identified and terminates the path at the root node. The nodes and edges identified through backtracking may be used by the path construction component 114 to reconstruct the hierarchical context of the relevant node. Thus, for a hierarchical or nested document, the structure of the fragments (e.g., as nodes and edges) may be reconstructed.

Figure 5:
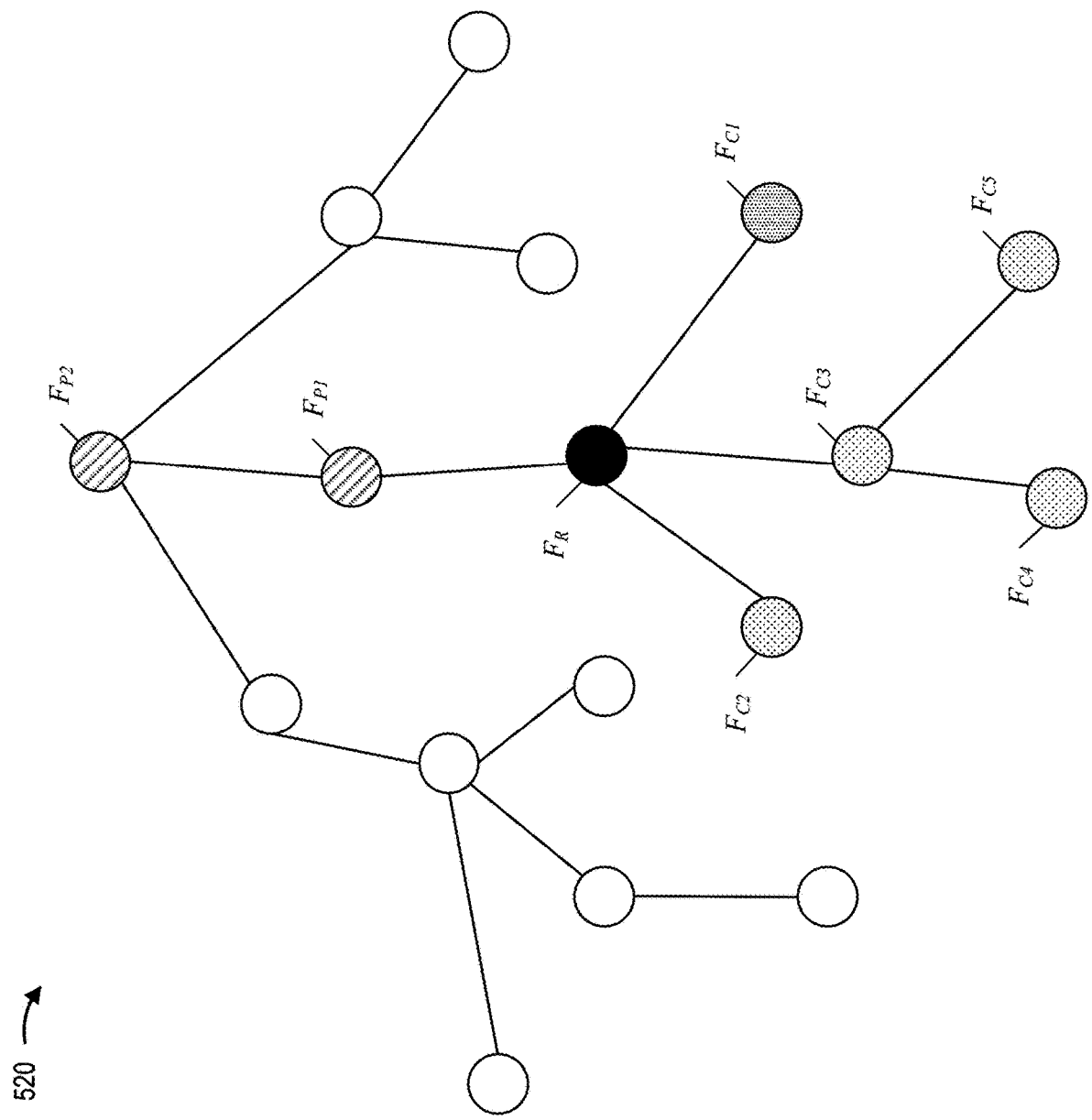
FIG. 5 depicts an example document graph for searching by an information retrieval system.

FIG. 5 depicts a simple example document graph 520, which may be an example of one of the set of document graphs 220, and/or document graph 320 in FIG. 3. Document graph 520 includes a plurality of nodes and edges embedded by document embedding component 314 in FIG. 3. An integrated search, such as an integrated search executed by the search component 106 in FIG. 2, identifies a relevant node $F_R$. The backtracking component 110 is configured to traverse the document graph 520 to identify the hierarchical structure of the relevant node $F_R$. In this example, the backtracking component 110 identifies a first parent node $F_{P1}$ of the relevant node $F_R$. A first step in the backtracking path is identified between the relevant node $F_R$ and the first parent node Fri. Next, the backtracking component 110 identifies a second parent node $F_{P2}$ of the first parent node $F_{P1}$ as the second step in the backtracking path. The backtracking component 110 continues until a root node (e.g., a node with no parent node) is reached. In this example, the second parent node $F_{P2}$ is a root node, however, in other examples; one or more additional parent nodes may be identified.

Returning to FIG. 2, the forward tracking component 112 is configured to traverse the document graph starting at the relevant node and continuing forward to identify one or more child nodes of the relevant node. In some embodiments, the forward tracking component 112 is configured to identify the immediate child node of the relevant node based on an edge connecting the relevant node and the child node. The forward tracking component 112 may continue to traverse the document graph to identify the immediate child node of the previously identified child node. This process may repeat until a leaf node is identified and terminates the path at each leaf node. The nodes and edges identified through forward tracking may be used by the path construction component 114 to reconstruct the detailed context of the relevant node. Thus, additional details, including additional nested content may be reconstructed for the relevant node.

Returning to the example document graph 520 in FIG. 5, the forward tracking component 112 is configured to traverse the document graph 520 to identify the nested structure and additional details of the relevant node $F_R$. In this example, the forward tracking component 112 identifies a first child node $F_{C1}$ of the relevant node $F_R$. A first step in the forward tracking path is identified between the relevant node $F_R$ and first child node $F_{C1}$ Next, the forward tracking component 112 identifies whether the first child node $F_{C1}$ has any additional child node(s). In this example, the first child node $F_{C1}$ is a leaf node (e.g., a node with no child node(s)).

The forward tracking component 112 identifies a second child node $F_{C2}$ of the relevant node $F_R$ is identified. Similarly to the first child node $F_{C1}$ in this example, the second child node $F_{C2}$ is also a leaf node. The forward tracking component 112 identifies a third child node $F_{C3}$ of the relevant node $F_R$. In this example, the third child node $F_{C3}$ has additional child nodes, a fourth child node $F_{C4}$ and a fifth child node $F_{C5}$ of the third child node $F_{C3}$, which are also identified by the forward tracking component 112.

Returning to FIG. 2, the path construction component 114 is configured to construct a path based on the backtracking component 110 and the forward tracking component 112 identifying parent and child nodes of the relevant node. The path construction component 114 is configured to dynamically construct a path comprising the parent, child, and relevant node(s) identified by the backtracking component 110 and the forward tracking component 112 to reconstruct the structural context and hierarchy of a document identified by the search component 106. The path construction component 114 may be configured to utilize a path traversal algorithm, such as Djikstra, breadth first search (BFS), depth-first search (DFS), and the like, to determine an optimal path to traverse the identified nodes. Djikstra is configured to find the shortest path between nodes on the graph to determine a shortest distance between the starting node and an ending node. BFS is configured to explore all nodes at the current depth before moving to the next depth and visiting all the nodes at that depth. DFS is configured to start at a root node and explore as far as possible along each branch before backtracking. In some embodiments, the path construction component 114 is configured to determine the shortest path between the identified nodes. Thus, for each relevant node, a hierarchical context and details are identified and organized, based on the constructed path. The optimal, or shortest path between the nodes indicates the hierarchical relationship between the nodes, thus, the constructed path represents the structural context of the search result, e.g., the relevant node.

The structured navigation component 108 repeats the process to reconstruct the hierarchy and context for each relevant node identified by the search component 106. The relevant node and associated hierarchy and context are provided to the semantic depth and syntactic structure search system 104 to provide to the user 102.

In some embodiments, the structured navigation component 108 provides the search results, including the relevant node and associated structural context, to the LLM 122 to present to the user. For example, in some embodiments, the LLM 122 may be configured to process the search results to generate a natural language response to the user. In some embodiments, the LLM 122 may be configured to utilize the search results as part of a RAG process and augment a prompt.

Note that FIG. 2 is just one example of a workflow, and other workflows including fewer, additional, or alternative operations are possible consistent with this disclosure.

Example GraphQL Query

Figure 6A:
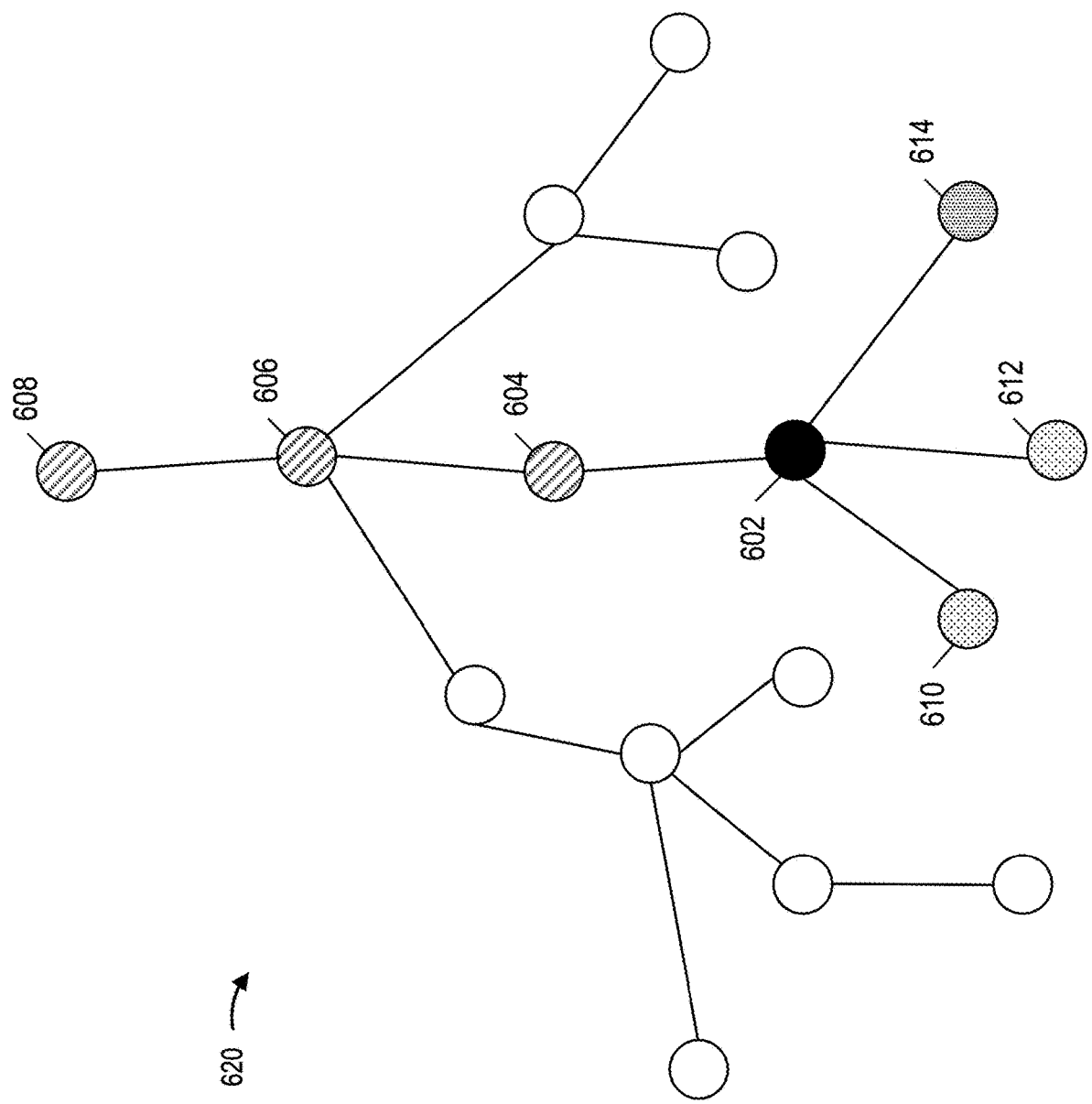
FIG. 6A depicts an example document graph for an API documentation which may be searched by an information retrieval system.

FIG. 6A depicts an example document graph embedding API documentation, in this example, a company's GraphQL schema which may be searched by a semantic depth and syntactic structure search system, such as the semantic depth and syntactic structure search system 104 in FIGS. 1 and 2, to generate a GraphQL query 600 depicted in FIG. 6B.

GraphQL is a query language for APIs to search data in resources of the API(s). GraphQL queries are structured and syntactically dependent to fetch data based on defined schemas (e.g., types and fields) of the data resources. GraphQL queries require specific recitation of the types and associated fields of available data, including hierarchical structure, and precise identification of those type(s) and field(s) of the data to be retrieved. A GraphQL query that is invalid, that is, a query that does not follow the defined schema, will not execute and no data is will be retrieved.

Generally, a GraphQL query is precisely constructed based on knowledge of the defined schemas associated with the available data resources. However, formulating a valid query without such knowledge would likely result in an invalid query and no results obtained. For example, a semantic depth and syntactic structure search system may enable generation of valid GraphQL queries to obtain desired data. Referring to FIGS. 6A and 6B, collectively, by searching through schema documentation, modelled as document graph 620 in FIG. 6A to identify relevant data types and attributes to return the desired data (e.g., a relevant node $F_R$ in FIG. 5) and reconstructing the hierarchical context of the relevant data types and attributes to generate a valid query. Beneficially, reconstruction enables a valid query to be generated because parent types and higher structure of the relevant data types and attributes is identified through path reconstruction, and lower level details are identified to generate a complete query.

For example, employee attribute data for a company may be requested. A GraphQL query may be formulated to obtain the employee characteristic data using the semantic depth and syntactic structure search system. However, as described, the GraphQL query needs to be formulated syntactically to be valid with the schema of the company's data. The semantic depth and syntactic structure search system is configured to search, such as with search component 106 described in FIG. 2, through the company's GraphQL schema to identify a type associated with employee characteristic data, that is, the type of data that contains employee characteristics. The type of data that contains employee characteristics may be determined to be a relevant node, e.g., element 602 of the document graph 620 embedding the company's GraphQL schema based on an integrated search by search component 106. In this example, the search component identifies a relevant node, element 602, an employee field, depicted in FIG. 6A as a relevant node in the document graph 620, and depicted in FIG. 6B as part of the query 600. Next, the semantic depth and syntactic structure search system reconstructs the hierarchical context and details associated with the relevant node, element 602. As described with respect to FIG. 2, a structured navigation component (e.g., the structured navigation component 108) is configured to traverse the document graph 620 embedding the company's GraphQL schema to build the context through backtracking and forward tracking, for example constructs the parent types associated with the employee characteristics data and attributes of the type to generate a full and valid query.

Backtracking, such as by backtracking component 110, comprises tracing a backward path from the relevant node (e.g., element 602) to identify higher-level hierarchical structure of the relevant node. In this example, backtracking identifies parent types of the element 602, for example, a team object 604, a department object 606, and a company object 608. Thereby, the employee field, element 602 is placed in the organizational context of the parent types. A backwards path is reconstructed (e.g., up the graph to a root, depicted in FIG. 6A as company object 608), to identify the hierarchical and organizational context of the identified relevant node (e.g., the fragment in the document), thereby adding context to the relevant node. Specifically, parent nodes of element 602 are identified as team object 604, department object 606, and company object 608 respectively.

Forward tracking, such as by forward tracking component 112, comprises tracing a forward path from the relevant node (e.g., element 602) to identify lower-level hierarchical structure and details of the relevant node. In this example, forward tracking identifies the fields of the element 602, including id field 610, name field 612, and position field 614. Each of these fields comprise leaf-level details (e.g., down the document graph 620 to leaf nodes), to identify the additional details of the identified relevant node (e.g., subsequent details in the document), thereby increasing the information associated with the relevant node.

Moreover, in this example, formulation of a GraphQL query is effectuated by identifying and capturing all of the syntax for forming a valid query. In this example, the parent objects (e.g., team object 604, department object 606, and company object 608) are associated with the employee object, and are used to obtain the employee attributes, as well as the employee fields (e.g., id field 610, name field 612, and position field 614). Thus, together, the employee attributes are identified in the company's GraphQL schema, and reconstructed into the hierarchical order to form a syntactically valid GraphQL query.

Therefore, the semantic depth and syntactic structure search system and methods described herein beneficially enables generation of a GraphQL query based on a search query to obtain the results. Specifically, the search system described herein generates a structured response, aligning with the structural context of the searched document. In this example, the valid GraphQL query is generated because the structural context, e.g., the company's schema, may be reconstructed after searching for the type that will return employee characteristics, including the associated attributes needed.

The example query 600 may then be executed on the company's data (e.g., through a GraphQL API) to obtain the employee characteristic data. Thus, in certain aspects, a valid GraphQL may be generated based on a search query with the semantic depth and syntactic structure search system.

Example Methods for Information Retrieval

Figure 7:
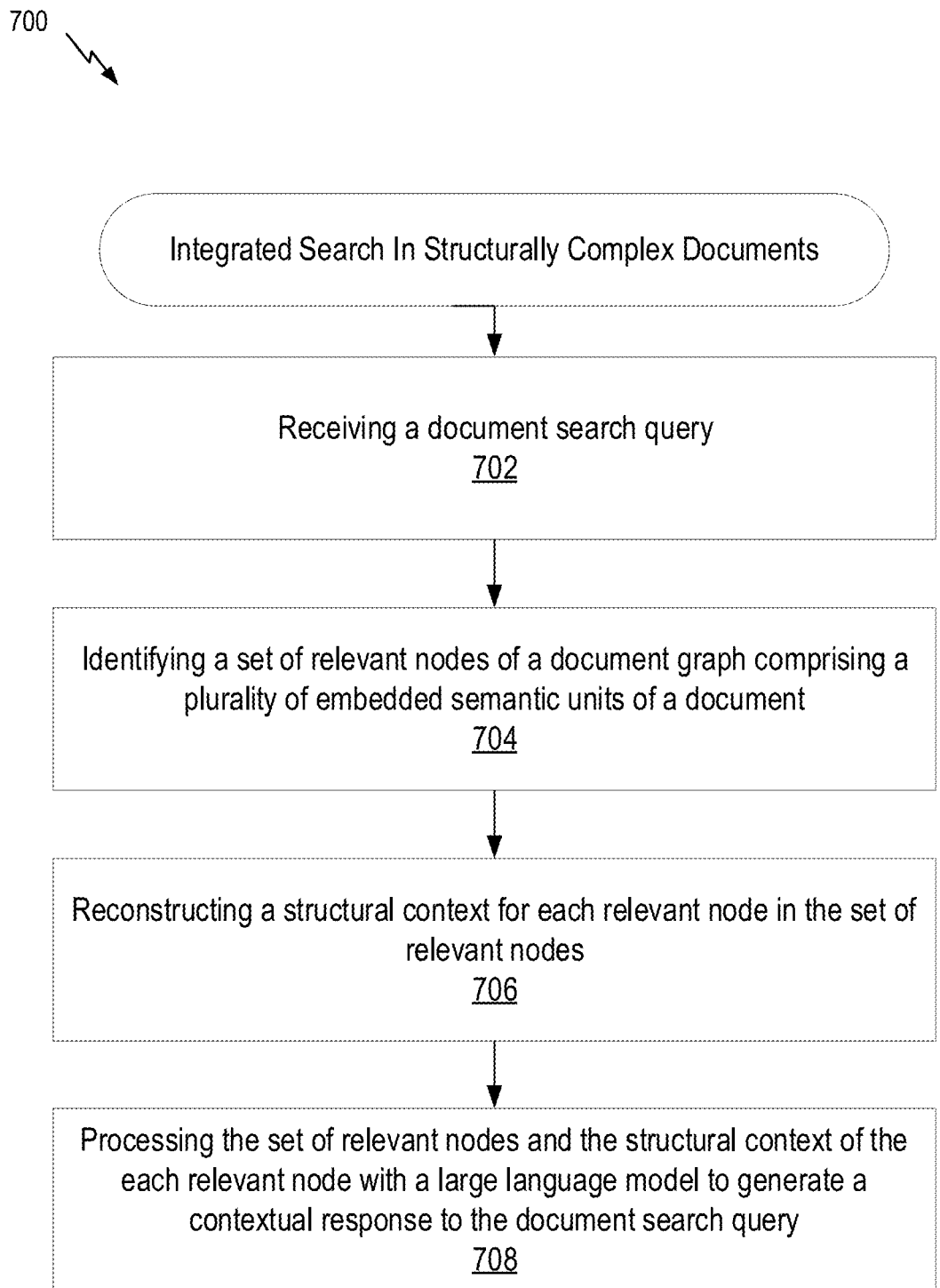
FIG. 7 depicts an example information retrieval method.

FIG. 7 depicts an example method 700 for document retrieval. In one aspect, method 700 can be implemented by the syntactic structure search system 104 of FIG. 2 and/or processing system 900 of FIG. 9.

Initially, method 700 begins at block 702 with receiving a document search query. In some embodiments, the document search query is received from an LLM, for example, LLM 122 in FIG. 2, as part of a RAG system. In some embodiments, the document search query is received from a user, for example, user 102 in FIG. 1.

Method 700 continues to block 704 with identifying a set of relevant nodes of a document graph comprising a plurality of embedded semantic units of a document, such as depicted in FIG. 3. In some embodiments, identifying the set of relevant nodes of the document graph comprises: performing a semantic search of the document graph based on the document search query to identify a first relevant node, for example, as described with respect to the search component 106 in FIG. 2; and performing a lexical search of the document graph based on the document search query to identify a second relevant node, for example, as described with respect to the search component 106 in FIG. 2.

In some embodiments, performing the semantic search of the document graph based on the document search query comprises determining a semantic similarity based on a distance between an embedded semantic unit of the plurality of embedded semantic units and an embedding of the document search query embedded in the document graph, for example, as described with respect to the search component 106 in FIG. 2. In some embodiments, the semantic similarity is indicated by a semantic relevance score, e.g., semantic relevance score($F_i$, Q), between the node and the query. In some embodiments, semantic similarity is indicated by a cosine similarity. In some embodiments, semantic similarity is indicated by an Euclidean distance. In some embodiments, a node may be determined to be semantically relevant based on the semantic relevance score of the node (e.g., fragment $F_i$) satisfying a threshold.

In some embodiments, performing the lexical search of the document graph based on the document search query comprises determining a lexical match between one or more terms of an embedded semantic unit of the plurality of embedded semantic units and the document search query, for example, as described with respect to the search component 106 in FIG. 2. In some embodiments, the lexical match is indicated by a lexical relevance score, e.g., lexical relevance score($F_i$, Q), between the node and the query. In some embodiments, the lexical match may be determined by a bag-of-words retrieval function. In some embodiments, a node may be determined to be lexically relevant based on the lexical relevance score of the node (e.g., fragment $F_i$) satisfying a threshold.

In some embodiments, identifying the set of relevant nodes of the document graph comprising the plurality of embedded semantic units of the document, further comprises: assigning a relevance score of the first relevant node of the document graph based on the semantic search and the lexical search; assigning a relevance score of the second relevant node of the document graph based on the semantic search and the lexical search; and selecting the set of relevant nodes based on the relevance score of the first relevant node and the relevance score of the second relevant node, for example, as described with respect to the search component 106 in FIG. 2. In some embodiments, the relevance score may be indicated by an integrated relevance score, e.g., Integrated Score($F_i$, Q), between the node and the query. In some embodiments, a relevant node may be identified based on the integrated relevance score satisfying a threshold, for example, an integrated relevance score may satisfy a threshold when it meets or exceeds an integrated relevance threshold. In some embodiments, a relevant node may be determined based on the top K nodes, for example, the fragments associated with the top 2, 5, 10, etc., integrated relevance scores.

In some embodiments, assigning the relevance score of the first relevant node of the document graph based on the semantic search and the lexical search comprises adjusting a weighting of the semantic search of the relevance score of the first relevant node to increase semantic depth of the relevance score, for example, as described with respect to the search component 106 in FIG. 2.

In some embodiments, assigning the relevance score of the first relevant node of the document graph based on the semantic search and the lexical search comprises adjusting a weighting of the lexical search of the relevance score of the first relevant node to increase lexical precision of the relevance score, for example, as described with respect to the search component 106 in FIG. 2.

Beneficially, the relevance score is based on both semantic search and lexical search to complement one another and provide lexically precise and conceptually relevant search results for the query. Moreover, in some embodiments, the relevance score may be dynamically adjusted to impart increased reliance on either the semantic search results or the lexical search results based on adjusting the weighting of either the semantic search or the lexical search. Thereby, the relevance of search results may be adjusted based on the context of the query.

Method 700 then continues to block 706 with reconstructing a structural context for each relevant node in the set of relevant nodes. In some embodiments, block 706 comprises: backtracking the document graph based on the each relevant node to identify a hierarchical structure of the relevant node for example, as described with the backtracking component 110 in FIG. 2; forward tracking the document graph based on the each relevant node to identify one or more details associated with the each relevant node for example, as described with respect to the forward tracking component 112 in FIG. 2; and constructing a path of the document graph based on the hierarchical structure of the each relevant node and the one or more details associated with the each relevant node for example, as described with respect to path construction component 114 in FIG. 2.

In some embodiments, backtracking the document graph based on the each relevant node to identify the hierarchical structure of the each relevant node, comprises: traversing the document graph to identify one or more parent nodes of the each relevant node; and terminating the traversing of the document graph when a root node of the document graph is identified as one of the one or more parent nodes of the each relevant node, wherein each of the one or more parent nodes indicates a hierarchical and context framework of the each relevant node within the document, for example, as described with the backtracking component 110 in FIG. 2.

In some embodiments, forward tracking the document graph based on the each relevant node to identify the one or more details associated with the each relevant node, comprises: traversing the document graph to identify one or more child nodes of the each relevant node; and terminating the traversing of the document graph when a leaf node of the document graph is identified as one of the one or more child nodes of the each relevant node, wherein each of the one or more child nodes indicates an additional detail associated with a semantic unit embedded as the each relevant node, for example, as described with respect to the forward tracking component 112 in FIG. 2.

In some embodiments, constructing the path of the document graph based on the hierarchical structure of the each relevant node and the one or more details associated with the each relevant node, comprises determining an optimal path to traverse one or more additional nodes identified based on backtracking and forward tracking of the document graph, wherein the optimal path indicates the relevant node's structural placement and context within the document, for example, as described with respect to path construction component 114 in FIG. 2. In some embodiments, the path may be constructed using a path traversal algorithm, such as Djikstra, breadth first search (BFS), depth-first search DFS, and the like, to determine an optimal path to traverse the identified nodes.

Generally, conventional search techniques chunk sections of a document to facilitate searching each chunk, but thereby also isolate each chunk from the other chunks and lose structure and context between the chunks. Construction of a path of the document graph enables reconstructing the hierarchical context of a search result to identify and associated such structural and syntactic context because the structural and syntactic context, e.g., sections, subsections, tables, etc., of the document may provide additional context beyond the accompanying text. Thus, search results may have broader context, imparting increased information and understanding.

Method 700 continues to block 708 with processing the set of relevant nodes and the structural context of the each relevant node with a large language model to generate a contextual response to the document search query, for example as described with respect to LLM 122 in FIG. 2. In some embodiments, the LLM may utilize the set of relevant nodes and the structural context of each relevant node in a RAG process. In some embodiments, the LLM may generate a summary of the set of relevant nodes and the structural context of the each relevant node.

Beneficially, method 700 enables the structural context of search results (e.g., relevant nodes) obtained in a document-based search retrieval to be reconstructed. In particular, method 700 enables an integrated search utilizing both lexical and semantic search to identify relevant nodes. Further, method 700 includes reconstructing the structural context of the search results to provide a structural framework for the relevant nodes. By proving such structural context, additional context and information may be obtained to improve the clarity and understanding of the search result. In some aspects, the information retrieval system and methods described herein may beneficially enable searching through highly structured documentation to identify information with the document relevant to the search request, as well as identify the structural context of the relevant information to supplement and expand on the context and details. Thereby, a comprehensive and coherent search result may be generated.

Note that FIG. 7 is just one example of a method, and other methods including fewer, additional, or alternative operations are possible consistent with this disclosure.

Figure 8:
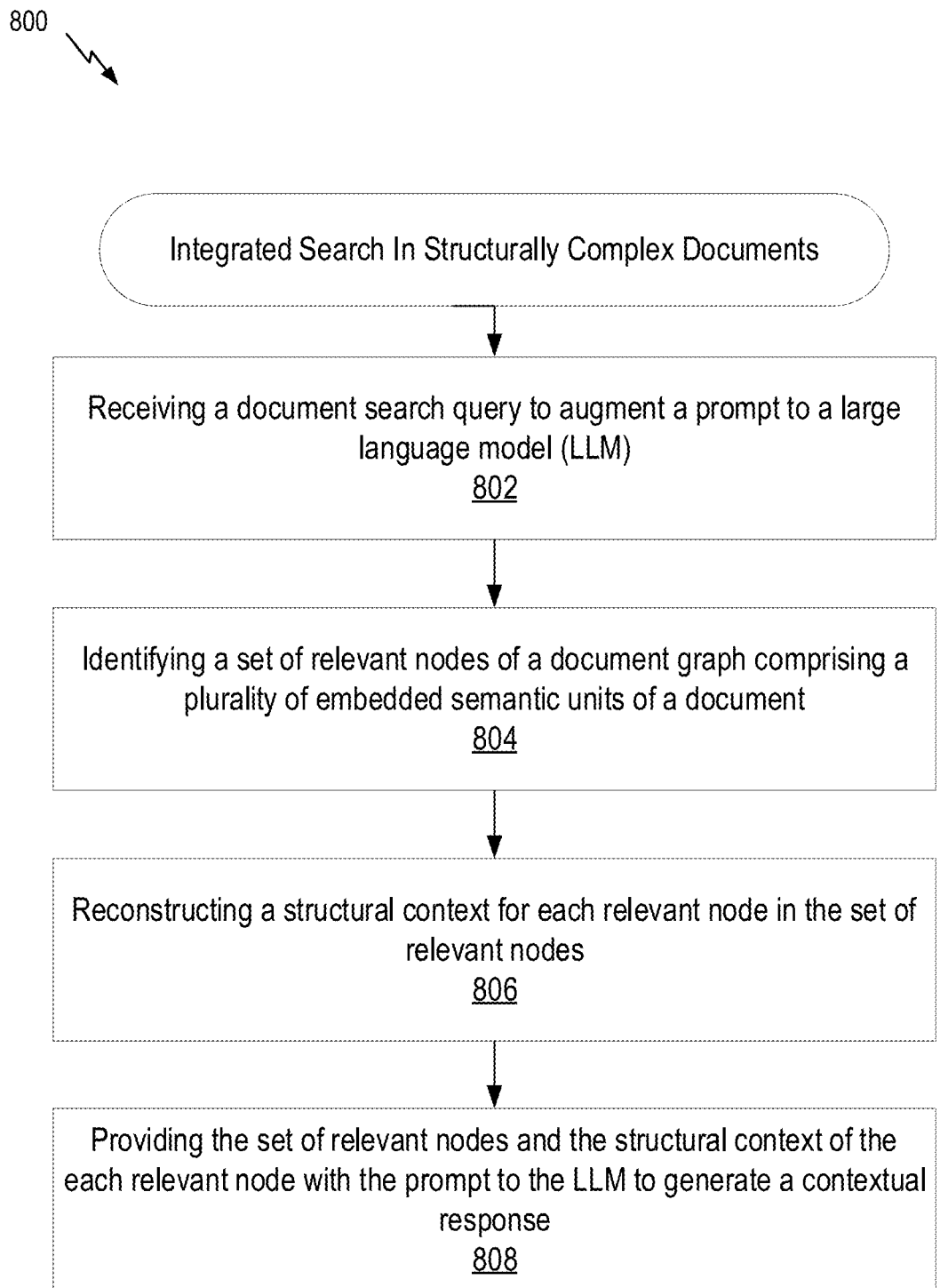
FIG. 8 depicts another example information retrieval method.

FIG. 8 depicts an example method 800 for information retrieval. In one aspect, method 800 can be implemented by the semantic depth and syntactic structure search system 104 of FIG. 2 and/or processing system 900 of FIG. 9.

Initially, method 800 begins at block 802 with receiving a document search query to augment a prompt to a large language model (LLM), for example, the LLM 122 in FIG. 2.

Method 800 continues to block 804 with identifying a set of relevant nodes of a document graph comprising a plurality of embedded semantic units of a document, such as depicted in FIG. 3, comprising: performing a semantic search of the document graph based on the document search query to identify a first relevant node, for example, as described with respect to the search component 106 in FIG. 2; and performing a lexical search of the document graph based on the document search query to identify a second relevant node, for example, as described with respect to the search component 106 in FIG. 2.

In some embodiments, performing the semantic search of the document graph based on the document search query comprises determining a semantic similarity based on a distance between an embedded semantic unit of the plurality of embedded semantic units and an embedding of the document search query embedded in the document graph, for example, as described with respect to the search component 106 in FIG. 2. In some embodiments, the semantic similarity is indicated by a semantic relevance score, e.g., semantic relevance score($F_i$, Q), between the node and the query. In some embodiments, semantic similarity is indicated by a cosine similarity. In some embodiments, semantic similarity is indicated by an Euclidean distance. In some embodiments, the semantic similarity may be determined based on the semantic relevance score of the node (e.g., fragment $F_i$) satisfying a threshold.

In some embodiments, performing the lexical search of the document graph based on the document search query comprises determining a lexical match between one or more terms of an embedded semantic unit of the plurality of embedded semantic units and the document search query, for example, as described with respect to the search component 106 in FIG. 2. In some embodiments, the lexical match is indicated by a lexical relevance score, e.g., lexical relevance score($F_i$, Q), between the node and the query. In some embodiments, the lexical match may be determined by a bag-of-words retrieval function. In some embodiments, the lexical match may be determined based on the lexical relevance score of the node (e.g., fragment $F_i$) satisfying a threshold.

In some embodiments, identifying the set of relevant nodes of the document graph comprising the plurality of embedded semantic units of the document, further comprises: assigning a relevance score of the first relevant node of the document graph based on the semantic search and the lexical search; assigning a relevance score of the second relevant node of the document graph based on the semantic search and the lexical search; and selecting the set of relevant nodes based on the relevance score of the first relevant node and the relevance score of the second relevant node, for example, as described with respect to the search component 106 in FIG. 2. In some embodiments, the relevance score may be indicated by an integrated relevance score, e.g., Integrated Score($F_t$, Q), between the node and the query. In some embodiments, a relevant node may be identified based on the integrated relevance score satisfying a threshold, for example, an integrated relevance score may satisfy a threshold when it meets or exceeds an integrated relevance threshold. In some embodiments, a relevant node may be determined based on the top K nodes, for example, the fragments associated with the top 2, 5, 10, etc., integrated relevance scores.

In some embodiments, assigning the relevance score of the first relevant node of the document graph based on the semantic search and the lexical search comprises adjusting a weighting of the semantic search of the relevance score of the first relevant node to increase semantic depth of the relevance score, for example, as described with respect to the search component 106 in FIG. 2.

In some embodiments, wherein assigning the relevance score of the first relevant node of the document graph based on the semantic search and the lexical search comprises adjusting a weighting of the lexical search of the relevance score of the first relevant node to increase lexical precision of the relevance score, for example, as described with respect to the search component 106 in FIG. 2.

Beneficially, the relevance score is based on both semantic search and lexical search to complement one another and provide lexically precise and conceptually relevant search results for the query. Moreover, in some embodiments, the relevance score may be dynamically adjusted to impart increased reliance on either the semantic search results or the lexical search results based on adjusting the weighting of either the semantic search or the lexical search. Thereby, the relevance of search results may be adjusted based on the context of the query.

Method 800 then continues to block 806 with reconstructing a structural context for each relevant node in the set of relevant nodes, comprising: backtracking the document graph based on the each relevant node to identify a hierarchical structure of the relevant node for example, as described with the backtracking component 110 in FIG. 2; forward tracking the document graph based on the each relevant node to identify one or more details associated with the each relevant node for example, as described with respect to the forward tracking component 112 in FIG. 2; and constructing a path of the document graph based on the hierarchical structure of the each relevant node and the one or more details associated with the each relevant node for example, as described with respect to path construction component 114 in FIG. 2.

In some embodiments, backtracking the document graph based on the each relevant node to identify the hierarchical structure of the each relevant node, comprises: traversing the document graph to identify one or more parent nodes of the each relevant node; and terminating the traversing of the document graph when a root node of the document graph is identified as one of the one or more parent nodes of the each relevant node, wherein each of the one or more parent nodes indicates a hierarchical and context framework of the each relevant node within the document, for example, as described with the backtracking component 110 in FIG. 2.

In some embodiments, forward tracking the document graph based on the each relevant node to identify the one or more details associated with the each relevant node, comprises: traversing the document graph to identify one or more child nodes of the each relevant node; and terminating the traversing of the document graph when a leaf node of the document graph is identified as one of the one or more child nodes of the each relevant node, wherein each of the one or more child nodes indicates an additional detail associated with a semantic unit embedded as the each relevant node, for example, as described with respect to the forward tracking component 112 in FIG. 2.

In some embodiments, constructing the path of the document graph based on the hierarchical structure of the each relevant node and the one or more details associated with the each relevant node, comprises determining an optimal path to traverse one or more additional nodes identified based on backtracking and forward tracking of the document graph, wherein the optimal path indicates the relevant node's structural placement and context within the document, for example, as described with respect to path construction component 114 in FIG. 2. In some embodiments, the path may be constructed using a path traversal algorithm, such as Djikstra, breadth first search (BFS), depth-first search DFS, and the like, to determine an optimal path to traverse the identified nodes.

Generally, conventional search techniques chunk sections of a document to facilitate searching, but also isolating each chunk. Construction of a path of the document graph enables reconstructing the hierarchical context of a search result to identify and associated such structural and syntactic context because the structural and syntactic context, e.g., sections, subsections, tables, etc., of the document may provide additional context beyond the accompanying text. Thus, search results may have broader context, imparting increased information and understanding.

Method 800 continues to block 808 with providing the set of relevant nodes and the structural context of the each relevant node with the prompt to the LLM to generate a contextual response, for example as described with respect to LLM 122 in FIG. 2.

Accordingly, method 800 construction of the structural context of search results (e.g., relevant nodes) in document-based search retrieval by utilizing both lexical and semantic search in an integrated search and reconstructing the structural context of the search results to provide a structural context. By proving such structural context, additional context and information may be obtained to improve the clarity and understanding of the search result. In some aspects, the information retrieval system and methods described herein may beneficially enable searching through highly-structured documentation, such as legal text, structured data files, or complex API documentation to identify information with the document relevant to the search request, as well as identify the structural context of the relevant information to supplement and expand on the context and details. Thereby, a comprehensive and coherent search result may be generated.

Note that FIG. 8 is just one example of a method, and other methods including fewer, additional, or alternative operations are possible consistent with this disclosure.

Example Processing System for Document Retrieval

Figure 9:
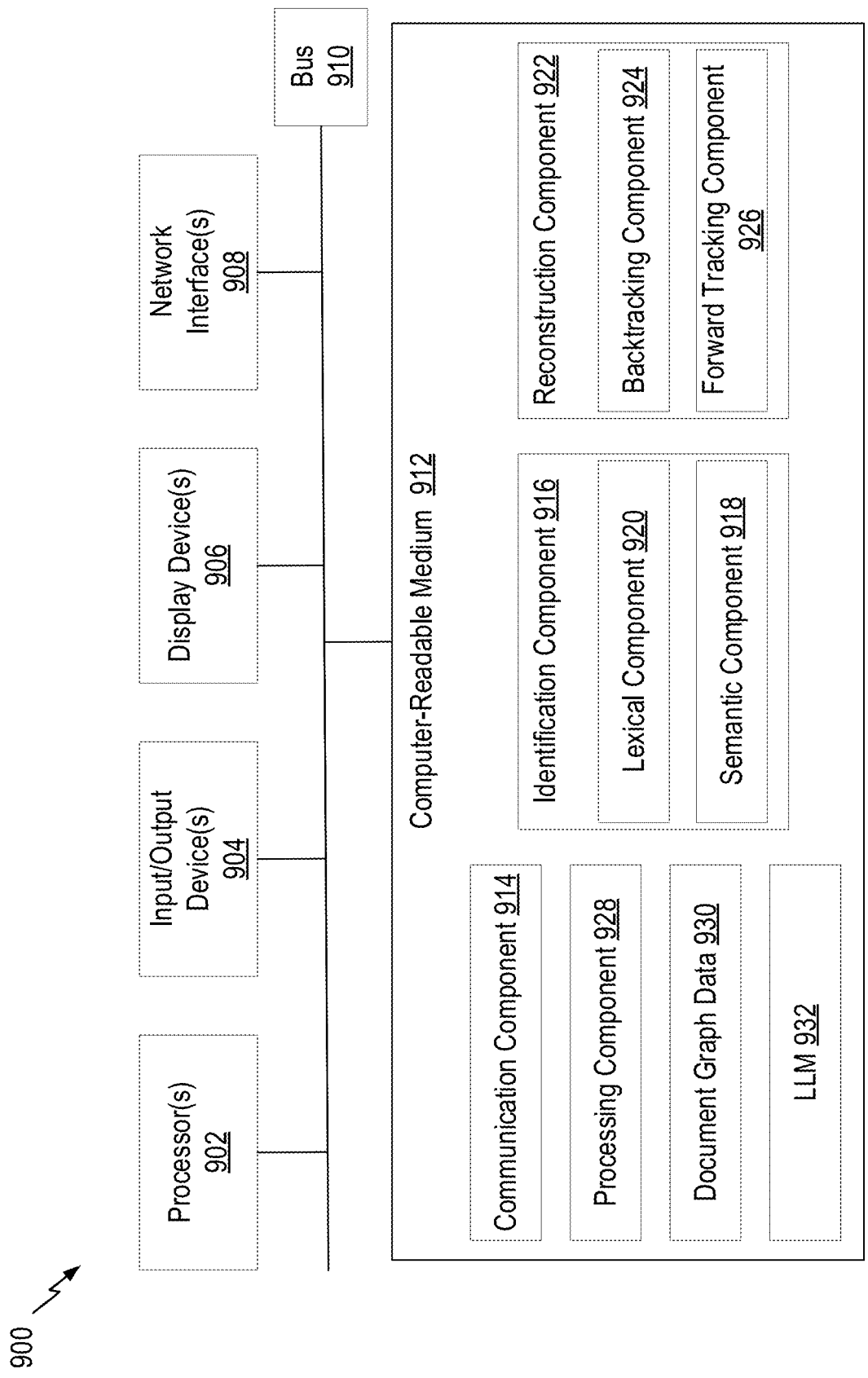
FIG. 9 depicts an example processing system with which aspects of the present disclosure can be performed.

FIG. 9 depicts an example processing system 900 configured to perform various aspects described herein, including, for example, method 700 as described above with respect to FIG. 7, or method 800 as described above with respect to FIG. 8.

Processing system 900 is generally be an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 900 includes one or more processors 902, one or more input/output devices 904, one or more display devices 906, one or more network interfaces 908 through which processing system 900 is connected to one or more networks (e.g., a local network, an intranet, the Internet, or any other group of processing systems communicatively connected to each other), and computer-readable medium 912. In the depicted example, the aforementioned components are coupled by a bus 910, which may generally be configured for data exchange amongst the components. Bus 910 may be representative of multiple buses, while only one is depicted for simplicity.

Processor(s) 902 are generally configured to retrieve and execute instructions stored in one or more memories, including local memories like computer-readable medium 912, as well as remote memories and data stores. Similarly, processor(s) 902 are configured to store application data residing in local memories like the computer-readable medium 912, as well as remote memories and data stores. More generally, bus 910 is configured to transmit programming instructions and application data among the processor(s) 902, display device(s) 906, network interface(s) 908, and/or computer-readable medium 912. In certain embodiments, processor(s) 902 are representative of a one or more central processing units (CPUs), graphics processing unit (GPUs), tensor processing unit (TPUs), accelerators, and other processing devices.

Input/output device(s) 904 may include any device, mechanism, system, interactive display, and/or various other hardware and software components for communicating information between processing system 900 and a user of processing system 900. For example, input/output device(s) 904 may include input hardware, such as a keyboard, touch screen, button, microphone, speaker, and/or other device for receiving inputs from the user and sending outputs to the user.

Display device(s) 906 may generally include any sort of device configured to display data, information, graphics, user interface elements, and the like to a user. For example, display device(s) 906 may include internal and external displays such as an internal display of a tablet computer or an external display for a server computer or a projector. Display device(s) 906 may further include displays for devices, such as augmented, virtual, and/or extended reality devices. In various embodiments, display device(s) 906 may be configured to display a graphical user interface.

Network interface(s) 908 provide processing system 900 with access to external networks and thereby to external processing systems. Network interface(s) 908 can generally be any hardware and/or software capable of transmitting and/or receiving data via a wired or wireless network connection. Accordingly, network interface(s) 908 can include a communication transceiver for sending and/or receiving any wired and/or wireless communication.

Computer-readable medium 912 may be a volatile memory, such as a random access memory (RAM), or a nonvolatile memory, such as nonvolatile random access memory (NVRAM), or the like. In this example, computer-readable medium 912 includes a communication component 914, an identification component 916, a lexical component 920, a semantic component 918, a reconstruction component 922, a backtracking component 924, a forward tracking component 926, a processing component 928, an LLM 932, and document graph data 930.

In certain embodiments, communication component 914 is configured to receive and send queries and responses, for example, query requests, document search queries, search results, relevant nodes and associated structural context, for example, as described with respect to block 702, and block 708 of FIG. 7, and block 802 and block 808 of FIG. 8. In some embodiments, the communication component 914 is configured to send queries to an LLM 932 and receive responses generated by the LLM 932. LLM 932 may be an example of LLM 122 in FIG. 2.

In certain embodiments, identification component 916 is configured to identify a set of relevant nodes of a document graph stored in document graph data 930, for example, based on a semantic search and/or a lexical search, such as described with respect to block 704 of FIG. 7 and block 804 of FIG. 8. Identification component 916 comprises a semantic component 918 configured to search the document graph semantically. Identification component 916 also comprises a lexical component 920 configured to search the document graph lexically, such as described with respect to FIG. 4.

In certain embodiments, reconstruction component 922 is configured to reconstruct a structural context for each relevant node identified by identification component 916 in the document graph data 930, such as described with respect to block 706 of FIG. 7 and block 806 of FIG. 8. Reconstruction component 922 comprises a backtracking component 924 configured to backtrack the document graph. Reconstruction component 922 further comprises a forward tracking component 926 configured to forward track the document graph, such as described with respect to FIG. 5.

In certain embodiments, processing component 928 is configured to process the set of relevant nodes identified by the identification component 916 and the structural context reconstructed by reconstruction component 922 to generate a contextual response to queries, such as described with respect to block 708 in FIG. 7 and block 808 in FIG. 8.

Note that FIG. 9 is just one example of a processing system consistent with aspects described herein, and other processing systems having additional, alternative, or fewer components are possible consistent with this disclosure.

Example Clauses

Implementation examples are described in the following numbered clauses:

Clause 1: A method of integrated search in structurally complex documents, comprising: receiving a document search query; identifying a set of relevant nodes of a document graph comprising a plurality of embedded semantic units of a document, comprising: performing a semantic search of the document graph based on the document search query to identify a first relevant node; and performing a lexical search of the document graph based on the document search query to identify a second relevant node; reconstructing a structural context for each relevant node in the set of relevant nodes, comprising: backtracking the document graph based on the each relevant node to identify a hierarchical structure of the relevant node; forward tracking the document graph based on the each relevant node to identify one or more details associated with the each relevant node; and constructing a path of the document graph based on the hierarchical structure of the each relevant node and the one or more details associated with the each relevant node; and processing the set of relevant nodes and the structural context of the each relevant node with a large language model to generate a contextual response to the document search query.

Clause 2: A method of integrated search in structurally complex documents, comprising: receiving a document search query to augment a prompt to a large language model (LLM); identifying a set of relevant nodes of a document graph comprising a plurality of embedded semantic units of a document, comprising: performing a semantic search of the document graph based on the document search query to identify a first relevant node; and performing a lexical search of the document graph based on the document search query to identify a second relevant node; reconstructing a structural context for each relevant node in the set of relevant nodes, comprising: backtracking the document graph based on the each relevant node to identify a hierarchical structure of the relevant node; forward tracking the document graph based on the each relevant node to identify one or more details associated with the each relevant node; and constructing a path of the document graph based on the hierarchical structure of the each relevant node and the one or more details associated with the each relevant node; and providing the set of relevant nodes and the structural context of the each relevant node with the prompt to the LLM to generate a contextual response.

Clause 3: The method of any one of clauses 1-2, wherein performing the semantic search of the document graph based on the document search query comprises determining a semantic similarity based on a distance between an embedded semantic unit of the plurality of embedded semantic units and an embedding of the document search query embedded in the document graph.

Clause 4: The method of any one of clauses 1-3, wherein performing the lexical search of the document graph based on the document search query comprises determining a lexical match between one or more terms of an embedded semantic unit of the plurality of embedded semantic units and the document search query.

Clause 5: The method of any one of clauses 1-4, wherein identifying the set of relevant nodes of the document graph comprising the plurality of embedded semantic units of the document, further comprises: assigning a relevance score of the first relevant node of the document graph based on the semantic search and the lexical search; assigning a relevance score of the second relevant node of the document graph based on the semantic search and the lexical search; and selecting the set of relevant nodes based on the relevance score of the first relevant node and the relevance score of the second relevant node.

Clause 6: The method of clause 5, wherein assigning the relevance score of the first relevant node of the document graph based on the semantic search and the lexical search comprises adjusting a weighting of the semantic search of the relevance score of the first relevant node to increase semantic depth of the relevance score.

Clause 7: The method of clause 5, wherein assigning the relevance score of the first relevant node of the document graph based on the semantic search and the lexical search comprises adjusting a weighting of the lexical search of the relevance score of the first relevant node to increase lexical precision of the relevance score.

Clause 8: The method of any one of clauses 1-7, wherein backtracking the document graph based on the each relevant node to identify the hierarchical structure of the each relevant node, comprises: traversing the document graph to identify one or more parent nodes of the each relevant node; and terminating the traversing of the document graph when a root node of the document graph is identified as one of the one or more parent nodes of the each relevant node, wherein each of the one or more parent nodes indicates a hierarchical and context framework of the each relevant node within the document.

Clause 9: The method of any one of clauses 1-8, wherein forward tracking the document graph based on the each relevant node to identify the one or more details associated with the each relevant node, comprises: traversing the document graph to identify one or more child nodes of the each relevant node; and terminating the traversing of the document graph when a leaf node of the document graph is identified as one of the one or more child nodes of the each relevant node, wherein each of the one or more child nodes indicates an additional detail associated with a semantic unit embedded as the each relevant node.

Clause 10: The method of any one of clauses 1-9, wherein constructing the path of the document graph based on the hierarchical structure of the each relevant node and the one or more details associated with the each relevant node, comprises determining an optimal path to traverse one or more additional nodes identified based on backtracking and forward tracking of the document graph, wherein the optimal path indicates the relevant node's structural placement and context within the document.

Clause 11: A processing system, comprising: a memory comprising computer-executable instructions; and a processor configured to execute the computer-executable instructions and cause the processing system to perform a method in accordance with any one of clauses 1-10.

Clause 12: A processing system, comprising means for performing a method in accordance with any one of clauses 1-10.

Clause 13: A non-transitory computer-readable medium storing program code for causing a processing system to perform the steps of any one of Clauses 1-10.

Clause 14: A computer program product embodied on a computer-readable storage medium comprising code for performing a method in accordance with any one of Clauses 1-10.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of integrated search in structurally complex documents, comprising:
    receiving a document search query;
    identifying a set of relevant nodes of a document graph comprising a plurality of embedded semantic units of a document, comprising:
        performing a semantic search of the document graph based on the document search query to identify a first relevant node; and
        performing a lexical search of the document graph based on the document search query to identify a second relevant node;
    reconstructing a structural context for each relevant node in the set of relevant nodes, comprising:
        backtracking the document graph based on the each relevant node to identify a hierarchical structure of the each relevant node;
        forward tracking the document graph based on the each relevant node to identify one or more details associated with the each relevant node; and
        constructing a path of the document graph based on the hierarchical structure of the each relevant node and the one or more details associated with the each relevant node, wherein the path of the document graph represents the structural context of the document; and
    processing the set of relevant nodes and the structural context of the each relevant node with a large language model to generate a contextual response to the document search query.

2. The method of claim 1, wherein performing the semantic search of the document graph based on the document search query comprises determining a semantic similarity based on a distance between an embedded semantic unit of the plurality of embedded semantic units and an embedding of the document search query embedded in the document graph.

3. The method of claim 1, wherein performing the lexical search of the document graph based on the document search query comprises determining a lexical match between one or more terms of an embedded semantic unit of the plurality of embedded semantic units and the document search query.

4. The method of claim 1, wherein identifying the set of relevant nodes of the document graph comprising the plurality of embedded semantic units of the document, further comprises:
    assigning a relevance score of the first relevant node of the document graph based on the semantic search and the lexical search;
    assigning a relevance score of the second relevant node of the document graph based on the semantic search and the lexical search; and
    selecting the set of relevant nodes based on the relevance score of the first relevant node and the relevance score of the second relevant node.

5. The method of claim 4, wherein assigning the relevance score of the first relevant node of the document graph based on the semantic search and the lexical search comprises adjusting a weighting of the semantic search of the relevance score of the first relevant node to increase semantic depth of the relevance score.

6. The method of claim 4, wherein assigning the relevance score of the first relevant node of the document graph based on the semantic search and the lexical search comprises adjusting a weighting of the lexical search of the relevance score of the first relevant node to increase lexical precision of the relevance score.

7. The method of claim 1, wherein backtracking the document graph based on the each relevant node to identify the hierarchical structure of the each relevant node, comprises:
    traversing the document graph to identify one or more parent nodes of the each relevant node; and terminating the traversing of the document graph when a root node of the document graph is identified as one of the one or more parent nodes of the each relevant node, wherein each of the one or more parent nodes indicates a hierarchical and context framework of the each relevant node within the document.

8. The method of claim 1, wherein forward tracking the document graph based on the each relevant node to identify the one or more details associated with the each relevant node, comprises:
  traversing the document graph to identify one or more child nodes of the each relevant node; and
  terminating the traversing of the document graph when a leaf node of the document graph is identified as one of the one or more child nodes of the each relevant node, wherein each of the one or more child nodes indicates an additional detail associated with a semantic unit embedded as the each relevant node.

9. The method of claim 1, wherein constructing the path of the document graph based on the hierarchical structure of the each relevant node and the one or more details associated with the each relevant node, comprises determining an optimal path to traverse one or more additional nodes identified based on backtracking and forward tracking of the document graph, wherein the optimal path indicates the each relevant node's structural placement and context within the document.

10. A processing system, comprising: a memory comprising computer-executable instructions; and a processor configured to execute the computer-executable instructions and cause the processing system to:
  receive a document search query;
  identify a set of relevant nodes of a document graph comprising a plurality of embedded semantic units of a document, comprising:
    perform a semantic search of the document graph based on the document search query to identify a first relevant node; and
    perform a lexical search of the document graph based on the document search query to identify a second relevant node;
  reconstruct a structural context for each relevant node in the set of relevant nodes, comprising:
    backtrack the document graph based on the each relevant node to identify a hierarchical structure of the each relevant node;
    forward track the document graph based on the each relevant node to identify one or more details associated with the each relevant node; and
    construct a path of the document graph based on the hierarchical structure of the each relevant node and the one or more details associated with the each relevant node; and
  process the set of relevant nodes and the structural context of the each relevant node with a large language model to generate a contextual response to the document search query.

11. The processing system of claim 10, wherein to perform the semantic search of the document graph based on the document search query, the processor is further configured to cause the processing system to determine a semantic similarity based on a distance between an embedded semantic unit of the plurality of embedded semantic units and an embedding of the document search query embedded in the document graph.

12. The processing system of claim 10, wherein to perform the lexical search of the document graph based on the document search query, the processor is further configured to cause the processing system to determine a lexical match between one or more terms of an embedded semantic unit of the plurality of embedded semantic units and the document search query.

13. The processing system of claim 10, wherein to identify the set of relevant nodes of the document graph comprising the plurality of embedded semantic units of the document, the processor is further configured to cause the processing system to:
  assign a relevance score of the first relevant node of the document graph based on the semantic search and the lexical search;
  assign a relevance score of the second relevant node of the document graph based on the semantic search and the lexical search; and
  select the set of relevant nodes based on the relevance score of the first relevant node and the relevance score of the second relevant node.

14. The processing system of claim 13, wherein to assign the relevance score of the first relevant node of the document graph based on the semantic search and the lexical search comprises adjusting a weighting of the semantic search of the relevance score of the first relevant node to increase semantic depth of the relevance score.

15. The processing system of claim 13, wherein assigning the relevance score of the first relevant node of the document graph based on the semantic search and the lexical search the processor is further configured to cause the processing system to adjusting a weighting of the lexical search of the relevance score of the first relevant node to increase lexical precision of the relevance score.

16. The processing system of claim 10, wherein to backtrack the document graph based on the each relevant node to identify the hierarchical structure of the each relevant node, the processor is further configured to cause the processing system to:
  traverse the document graph to identify one or more parent nodes of the each relevant node; and
  terminate the traversing of the document graph when a root node of the document graph is identified as one of the one or more parent nodes of the each relevant node, wherein each of the one or more parent nodes indicates a hierarchical and context framework of the each relevant node within the document.

17. The processing system of claim 10, wherein to forward track the document graph based on the each relevant node to identify the one or more details associated with the each relevant node, the processor is further configured to cause the processing system to:
  traverse the document graph to identify one or more child nodes of the each relevant node; and
  terminate the traversing of the document graph when a leaf node of the document graph is identified as one of the one or more child nodes of the each relevant node, wherein each of the one or more child nodes indicates an additional detail associated with a semantic unit embedded as the each relevant node.

18. The processing system of claim 10, wherein to construct the path of the document graph based on the hierarchical structure of the each relevant node and the one or more details associated with the each relevant node, the processor is further configured to cause the processing system to determine an optimal path to traverse one or more additional nodes identified based on backtracking and forward tracking of the document graph, wherein the optimal path indicates the each relevant node's structural placement and context within the document.

19. A method of integrated search in structurally complex documents, comprising:
- receiving a document search query to augment a prompt to a large language model (LLM);
- identifying a set of relevant nodes of a document graph comprising a plurality of embedded semantic units of a document, comprising:
  - performing a semantic search of the document graph based on the document search query to identify a first relevant node; and
  - performing a lexical search of the document graph based on the document search query to identify a second relevant node;
- reconstructing a structural context for each relevant node in the set of relevant nodes, comprising:
  - backtracking the document graph based on the each relevant node to identify a hierarchical structure of the each relevant node;
  - forward tracking the document graph based on the each relevant node to identify one or more details associated with the each relevant node; and
  - constructing a path of the document graph based on the hierarchical structure of the each relevant node and the one or more details associated with the each relevant node; and
- providing the set of relevant nodes and the structural context of the each relevant node with the prompt to the LLM to generate a contextual response.

20. The method of claim 19, wherein constructing the path of the document graph based on the hierarchical structure of the each relevant node and the one or more details associated with the each relevant node, comprises determining an optimal path to traverse one or more additional nodes identified based on backtracking and forward tracking of the document graph, wherein the optimal path indicates the each relevant node's structural placement and context within the document.

* * * * *